US006907982B2

(12) United States Patent
Olson et al.

(10) Patent No.: US 6,907,982 B2
(45) Date of Patent: Jun. 21, 2005

(54) AUTOMATIC TRAY HANDLING SYSTEM FOR SORTER

(75) Inventors: Douglas E. Olson, Grand Rapids, MI (US); Gary P. Burns, Rockford, MI (US); Ricardo N. Schiesser, Grand Rapids, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 10/437,115

(22) Filed: May 13, 2003

(65) Prior Publication Data

US 2004/0016623 A1 Jan. 29, 2004

Related U.S. Application Data

(63) Continuation of application No. 09/629,009, filed on Jul. 31, 2000, now Pat. No. 6,561,339.

(60) Provisional application No. 60/148,831, filed on Aug. 13, 1999, provisional application No. 60/166,079, filed on Nov. 17, 1999, and provisional application No. 60/211,140, filed on Jun. 13, 2000.

(51) Int. Cl.[7] .............................................. B65G 29/00

(52) U.S. Cl. .................................... 198/465.1; 209/606

(58) Field of Search .............................. 198/349, 346.1, 198/465.1, 347.2, 347.3, 468.01, 468.9, 468.11; 209/606, 651, 552, 653, 900, 917, 921

(56) References Cited

U.S. PATENT DOCUMENTS

| | | | | |
|---|---|---|---|---|
| 4,151,447 A | | 4/1979 | von der Heide et al. | 318/135 |
| 4,468,165 A | * | 8/1984 | Kawasaki | 414/403 |
| 4,624,617 A | | 11/1986 | Belna | 414/347 |

(Continued)

FOREIGN PATENT DOCUMENTS

| | | | |
|---|---|---|---|
| EP | 0 495661 A2 | 7/1992 | B07C/3/18 |

(Continued)

OTHER PUBLICATIONS

Minutes of the Mailers' Technical Committee, Sep. 16–17, 1998.

Mannesmann Dematic, Rapistan Systems AFSM–100 brochure, 2000.

*Primary Examiner*—Richard Ridley
(74) *Attorney, Agent, or Firm*—Van Dyke, Gardner, Linn & Burkhart, LLP

(57) ABSTRACT

An automatic tray handling system for use with an article or mail sortation system, such as a flats mail sortation system, is operable to automatically remove filled or partially filled trays from individual sorter units and to replenish the sorter units with empty trays. The empty trays and/or filled trays are moved along at least one conveying surface adjacent to the sorter units. The automatic tray handling system includes a plurality of tray moving devices, which are operable to move the empty trays from the conveying surface to the sorter units, whereby the trays are at least partially filled by the sorter units. The tray moving devices are then further operable to move the at least partially filled trays from the sorter units to a conveying surface, whereby the filled trays may be conveyed to downstream operations, such as an automatic labeling station. Preferably, the empty trays are movable in a continuous loop about the mail sortation system. The automatic tray handling system may include an upper and lower conveying surface and a vertical tray moving device, which is operable to lower empty trays from the upper conveying surface to the lower, empty tray-conveying surface, whereby the empty trays are returned to an upstream end of the conveying surface along the sorter units. The empty trays may be conveyed along the conveying surfaces and may be moved into a proper position for filling at an appropriate one of the multiple sorter units positioned therealong.

20 Claims, 15 Drawing Sheets

U.S. PATENT DOCUMENTS

| | | | | | |
|---|---|---|---|---|---|
| 4,958,716 | A | | 9/1990 | Matsuo et al. | 198/346.1 |
| 5,263,300 | A | * | 11/1993 | Plent et al. | 53/244 |
| 5,385,243 | A | * | 1/1995 | Jackson et al. | 209/509 |
| 5,588,520 | A | | 12/1996 | Affaticati et al. | 198/370.06 |
| 5,718,321 | A | * | 2/1998 | Brugger et al. | 198/359 |
| 5,803,704 | A | * | 9/1998 | Lazzarotti | 414/793.4 |
| 5,959,868 | A | | 9/1999 | Oppliger et al. | 364/478.14 |
| 6,024,425 | A | * | 2/2000 | Imai et al. | 312/35 |
| 6,026,967 | A | | 2/2000 | Isaacs et al. | 209/539 |
| 6,253,901 | B1 | | 7/2001 | Hintz et al. | 198/370.06 |
| 6,253,904 | B1 | | 7/2001 | Soldavini | 198/431 |
| 6,276,509 | B1 | * | 8/2001 | Schuster et al. | 198/370.02 |
| 6,501,041 | B1 | * | 12/2002 | Burns et al. | 209/584 |
| 6,561,339 | B1 | | 5/2003 | Olson et al. | 198/349 |
| 6,561,360 | B1 | * | 5/2003 | Kalm et al. | 209/606 |

FOREIGN PATENT DOCUMENTS

| | | | | |
|---|---|---|---|---|
| EP | 0761322 | A1 | 3/1997 | B07C/3/06 |
| EP | 0774303 | A2 | 5/1997 | B07C/3/08 |
| WO | WO9934936 | | 7/1999 | B07C/3/08 |

* cited by examiner

10

18

100

AUTOMATIC TRAY HANDLING SYSTEM FOR SORTER

CROSS REFERENCE TO RELATED APPLICATIONS

The present application is a continuation of U.S. patent application, Ser. No. 09/629,009, filed Jul. 31, 2000, now U.S. Pat. No. 6,561,339, which claims benefit of U.S. Provisional Pat. Applications, Ser. No. 60/148,831, filed Aug. 13, 1999 by G. Burns and D. Olson for DELIVERY POINT SEQUENCING MAIL SORTING SYSTEM WITH FLAT MAIL CAPABILITY; Ser. No. 60/166,079, filed Nov. 17, 1999 by R. Schiesser for LINEAR ACTUATOR; and Ser. No. 60/211,140, filed Jun. 13, 2000 by G. Burns and D. Olson for AUTOMATIC TRAY HANDLING SYSTEM FOR SORTER (Attorney Docket No. RAPO4 P-612), which are hereby incorporated in their entireties herein by reference.

BACKGROUND OF THE INVENTION

The present invention relates generally to tray handling equipment for removing filled or partially filled trays from a mail sorter and replenishing the mail sorter with empty trays. The invention is particularly useful with flats mail sorters.

Flats mail sorters are known and are commercially available. Flats mail sorters sort flat mail, such as magazines, large envelopes and the like, and discharge the sorted mail into trays. Each of these trays may be devoted to a particular mail distribution center, carrier route, delivery point, zip code or the like. Typically, a mail sortation system includes one or more rows of multiple sorter units. Examples of flats mail sorters include models FSM100 and TOPS 2000, marketed in the United States by Rapistan Systems of Atecs Mannesmann AG. As the mail is sorted, the filled or partially filled trays must be removed from the location at the particular sorter and replaced with an empty tray. Occasionally, there is also a requirement that a sweep operation be performed, whereby all of the trays are removed from their respective locations, even if the trays are only partially filled. Empty trays are then stocked at each of the sorters.

The removal of filled or partially filled trays and replacement with empty trays is traditionally performed manually. One or more operators must manually remove the at least partially filled tray from each of the multiple sorters and replace it with an empty tray, such that the sorter may continue the sortation process. Accordingly, the operation of the sorting machines is quite labor intensive.

A system has been proposed which includes a shuttle cart that travels underneath the chutes of the mail sorter units and carries multiple trays thereon. The trays are hoisted up into position beneath an appropriate sorter unit and locked or clamped in position at the sorter unit, so the cart may move to another sorter unit. Once filled, the trays are grabbed and moved down onto a shuttle cart for transporting the tray from the sorter unit. Such a system requires a rigid tray that is strong enough to withstand the clamping of the tray during the filling process. The system is also slow to provide empty trays to the sorter units and to move the full trays away from the sorter units.

Therefore, it is desirable to automate the manual processes of providing an empty tray to a sorter and/or removing an at least partially filled tray from the sorter.

SUMMARY OF THE INVENTION

The present invention is intended to provide an automatic tray handling system for an article sortation system, such as a flats mail sortation system. The tray handling system is operable to remove at least partially filled trays from multiple sorter units and provide empty trays to the sorter units for filling with articles, such as mail and the like.

According to one aspect of the present invention, an automatic tray handling system for use with an article sorter includes at least one conveying surface and a plurality of tray moving devices. The article sorter includes a plurality of tray support areas for positioning a tray while the tray is being filled with sorted articles. The conveying surface is operable to convey empty trays and/or at least partially filled trays generally adjacent to the tray support areas. The tray moving devices are operable to move empty trays from the conveying surface to the tray support areas and to move at least partially filled trays from the tray support areas to the conveying surface.

In one form, the tray handling system is operable to convey empty trays in a generally continuous loop about the conveying surfaces until the empty trays are selected and filled at a sorter unit. The article sorter system may include a pair of rows of sorter units. Preferably, the conveying surfaces include a first and second conveying surface along each side of the article sorter system. Empty trays may be removed from the first conveying surface and, after filling at the sorter unit, may be inducted back onto the first conveying surface and conveyed to a labeling station at a discharge end of the tray handling system. Preferably, the first conveying surface is positioned above the second conveying surface. A vertical tray moving device may be positioned at a downstream end of the first conveying surface to remove empty trays from the first conveying surface and move the trays down onto the second conveying surface so the empty trays may continue to cycle along the conveying surfaces. A connecting conveyor may connect a downstream end of the second conveying surfaces to an upstream end of the first conveying surfaces to complete the loop.

In another form, the conveying surface comprises an empty tray conveyor and a filled tray conveyor. Empty trays are removed from the empty tray conveyor and moved to the sorter unit for filling. The filled trays or at least partially filled trays are then moved from the sorter unit to the filled tray conveyor for conveyance to a downstream operation, such as a labeling station at a discharge end of the tray handling system.

Preferably, the filled or partially filled trays are electronically identified and tracked as they proceed along the conveying surface. A labeling station may be positioned at a downstream end of the conveying surface and may be operable to create and affix a label to each filled tray as it arrives at the labeling station. The labeling station may also include a scanner to verify that the label affixed to each tray is appropriate for the electronic identification of that particular tray.

According to another aspect of the present invention, a method for handling trays is provided for use with an article sorter which includes a plurality of sorter units and a plurality of corresponding tray support areas for positioning a tray while the tray is being filled with sorted articles. The method includes providing at least one conveying surface along the sorter units and conveying empty trays along the conveying surface. The method further includes moving empty trays from the conveying surface to a tray support area and at least partially filling the empty tray at the tray support area. The partially filled trays are then moved onto the conveying surface and may then be conveyed therealong to a downstream operation, such as a labeling station.

Preferably, empty and filled trays are conveyed along a first conveying surface, while empty trays are conveyed along a second conveying surface. The empty trays may be moved from a downstream end of the first conveying surface onto an upstream end of the second conveying surface. The empty trays are than movable along the second tray conveying surface to return toward an upstream end of the first conveying surface.

In one form, the article sorter includes a pair of rows of sorter units along opposite sides of the article sorter. Preferably, the method provides for moving trays in a generally continuous loop around first and second conveying surfaces at both sides of the article sorter. More particularly, the method may provide for moving empty trays at a downstream end of the second conveying surface at a first side of the article sorter onto an upstream end of the first conveying surface at the second side of the article sorter. The empty trays are then conveyed along the first conveying surface along the second side and then moved from a downstream end thereof to an upstream end of the second conveying surface at the second side of the article sorter. The empty trays are then conveyed along the second conveying surface at the second side to a downstream end thereof. The empty trays are then moved from the downstream end of the second conveying surface at the second side to an upstream end of the first conveying surface at the first side of the article sorter. The empty trays are then conveyed along the first conveying surface at the first side of the article sorter and moved from a downstream end thereof to an upstream end of the second conveying surface at the first side. The empty trays are then conveyed along the second conveying surface at the first side to the downstream end thereof, thereby completing the continuous loop.

Preferably, the first conveying surface is positioned generally above the second conveying surface. The empty trays are moved from the downstream end of the first conveying surface to the upstream end of the second conveying surface via a vertical tray moving device. Also, the empty trays are moved from the downstream end of the second conveying surface to the upstream end of the first conveying surface via a return device, such as a connecting conveyor surface, such as an incline ramp belt conveyor.

Therefore, the present invention provides an automatic tray handling system for an article sorter which is operable to remove at least partially filled trays from a sorter unit along the article sorter and replenish the sorter unit with an empty tray. The present invention provides movement of empty trays in a generally continuous loop about the article sortation system until the empty trays are selected and filled by the sorter units. Accordingly, the present invention substantially reduces the manual labor required to exchange filled trays with empty trays at an article sortation system, such as a flats mail sorter or the like.

DESCRIPTION OF THE PREFERRED EMBODIMENTS

Figure 1:
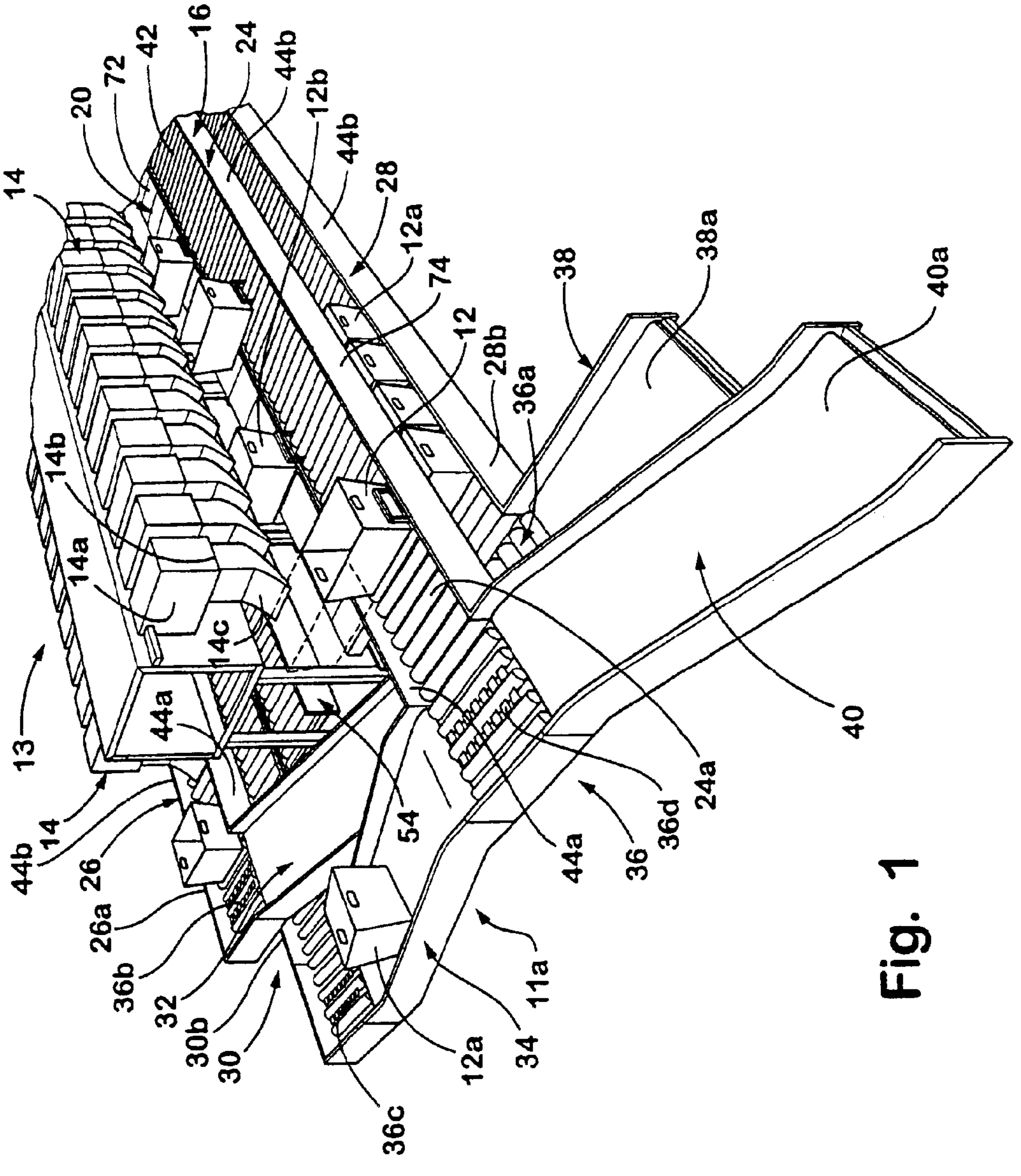
FIG. 1 is a perspective view of an input end of an automatic tray handling system according to the present invention.
Figure 2:
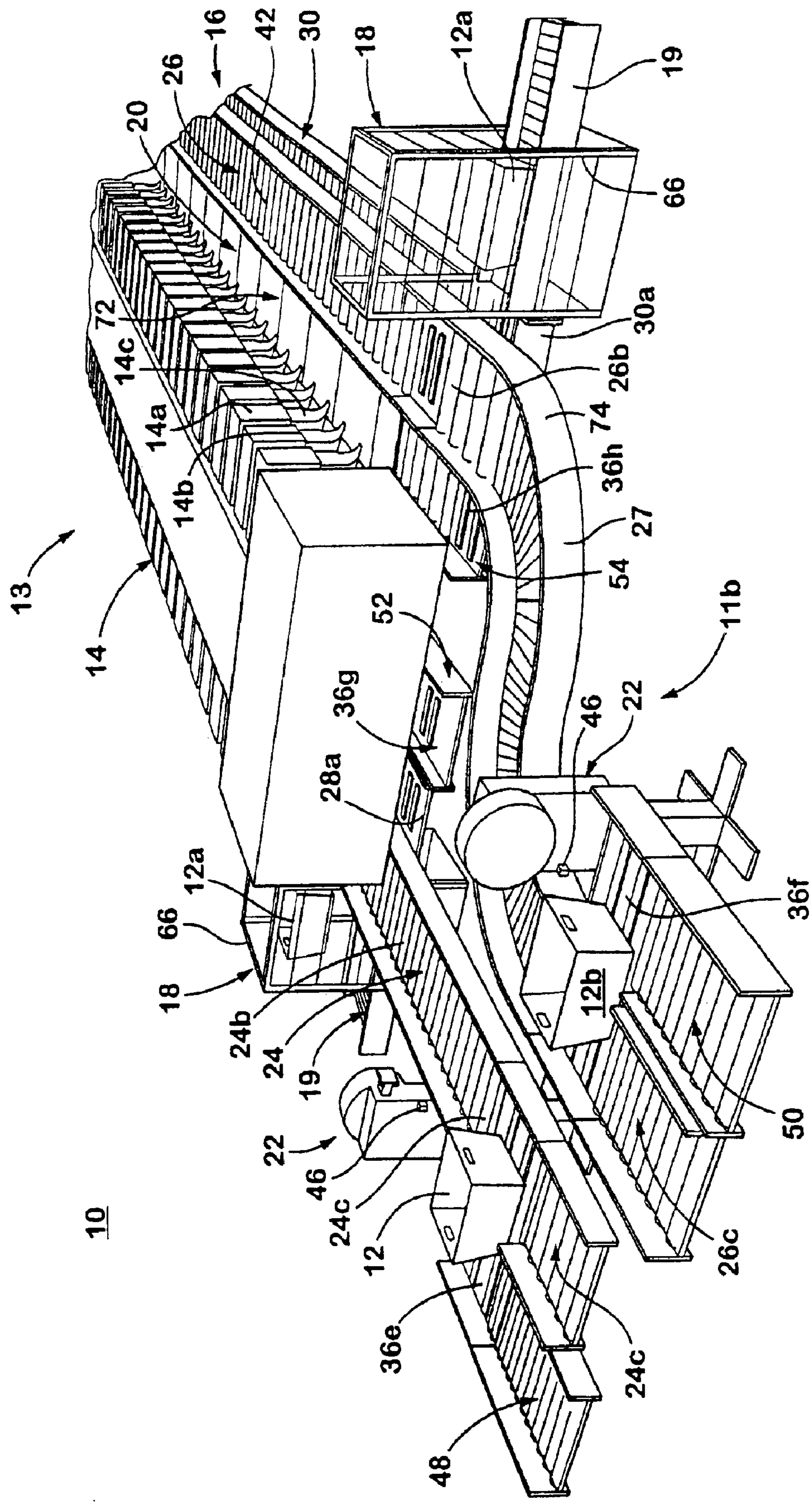
FIG. 2 is a perspective view of a discharge end of the automatic tray handling system of FIG. 1.

Referring now to the drawings and the illustrative embodiments depicted therein, an automatic tray handling system 10 is operable to provide empty trays 12*a* to a plurality of mail sorter units 14 of a sortation system 13, and to remove at least partially filled trays 12*b* from the sorter units 14 after the trays are filled (FIGS. 1 and 2). Although the invention is usable with a wide variety of mail or article sortation systems, it is illustrated with a model ASM100 flats mail sorter marketed in the United States by Rapistan Systems of Atecs Mannesmann AG. Automatic tray handling system 10 includes a plurality of conveying surfaces 16, which are operable to move the trays 12 along one or both sides of the sorter units 14. A plurality of tray moving devices 20 are operable at respective sorter units 14 to pull empty trays 12*a* onto a tray support 72, which supports the empty tray while the sorter system discharges sorted mail into the tray. After the tray is at least partially filled by the sorter unit, the tray moving device 20 is then operable to move the at least partially filled tray back onto the conveying surface. Accordingly, the present invention provides a continuous supply of empty trays to the tray sorting units 14, and automatically discharges filled or at least partially filled trays from the sorter units onto the conveying surface 16, thereby substantially reducing the amount of manual labor processes required to replace filled trays with empty trays at each sorter unit.

Sorter units 14 of sortation system 13 are generally known and are commercially available, such that a detailed description of these devices is not included herein. Suffice it to say that each sorter unit 14 includes a bucket 14*a*, a sorting device 14*b* and a chute 14*c*. Unsorted mail or other articles are provided at the buckets 14*a* via a supply system (not shown), where the articles are then sorted by the sorting devices 14*b* and fall from the chute 14*c* into the bins or trays 12. As shown in FIG. 1, an input end 11*a* of tray handling system 10 preferably provides one or more induct stations 38 and 40 for loading or inducting empty trays onto the tray handling system, while a discharge end 11*b* (FIG. 2) of tray handling system 10 provides a downstream operation, such as a labeling station 22 which is operable to label the trays as they are discharged from tray handling system 10. The sorter units 14 may be arranged in a pair of rows, and the conveying surfaces 16 of automatic tray handling system 10 may extend around both sides of the rows of sorter units 14. However, the principles of the present invention are equally applicable to a single side of a mail sortation system which has one or more rows of sorter units. Empty trays 12*a* are preferably movable in a continuous loop via conveying surfaces 16 and a pair of vertical tray moving or tray return devices 18 at one end of the tray handling system 10 (FIG. 2). At least partially filled trays are conveyed from their respective sorter unit to labeling station 22 at discharge end 11*b* of tray handling system 10.

As best seen in FIGS. 1–5, conveying surface 16 includes a plurality of conveying surfaces. More particularly, conveying surface 16 preferably includes a pair of opposite upper conveyors 24 and 26, a pair of opposite lower conveyors 28 and 30 and a pair of tray moving or return devices, such as incline or connecting surfaces or ramps 32 and 34, which are operable to move empty trays from lower conveyor 28 to upper conveyor 26 and from lower conveyor 30 to upper conveyor 24, respectively, at input end 11*a*. A pop up belt transfer or 90 degree transfer 36 is positioned at each end of the incline ramps 32 and 34 to change the direction of travel of the trays 12 as they move from one of the lower conveyors to the respective incline ramp, and from the incline ramp to the respective upper conveyor. Such transfer units are commercially available and known in the art, such that a detailed discussion will not be included herein. Briefly, transfer units 36 are operable to convey a tray in a direction along the conveyor at which they are positioned, and may be operable to raise one or more belt conveyor strips to convey a tray positioned at the transfer unit in a direction which is generally transverse or normal to the conveyor direction.

Induct stations 38 and 40 are preferably positioned side by side one another, as shown in FIG. 1. Preferably, induct stations 38 and 40 comprise belt conveyors, which are operable to transport or convey an empty tray onto a corresponding 90 degree transfer unit 36*a* and 36*d*, respectively. Empty trays may be manually or automatically loaded onto the induct stations to induct the empty trays into the conveyor system 16 of the automatic tray handling system 10. Preferably, induct station 40 comprises an inclined belt conveyor, such that an input end 38*a* and 40*a* of the induct stations 38 and 40, respectively, are positioned at substantially the same level for easy access and loading of empty trays onto the induct stations 38 and 40.

Similar to induct stations 38 and 40, incline ramps 32 and 34 also preferably include belt conveyors, which are operable to move a continuous belt along the conveying path, as is know in the art. Incline ramp 32 is connected between a pair of 90 degree transfer units 36*a* and 36*b* at a downstream end 28*b* of lower conveyor 28 and an upstream end 26*a* of upper conveyor 26, respectively. Similarly, incline ramp 34 is connected between a pair of 90 degree transfer units 36*c* and 36*d* at a downstream end 30*b* of lower conveyor 30 and an upstream end 24*a* of upper conveyor 24, respectively.

Figure 3:
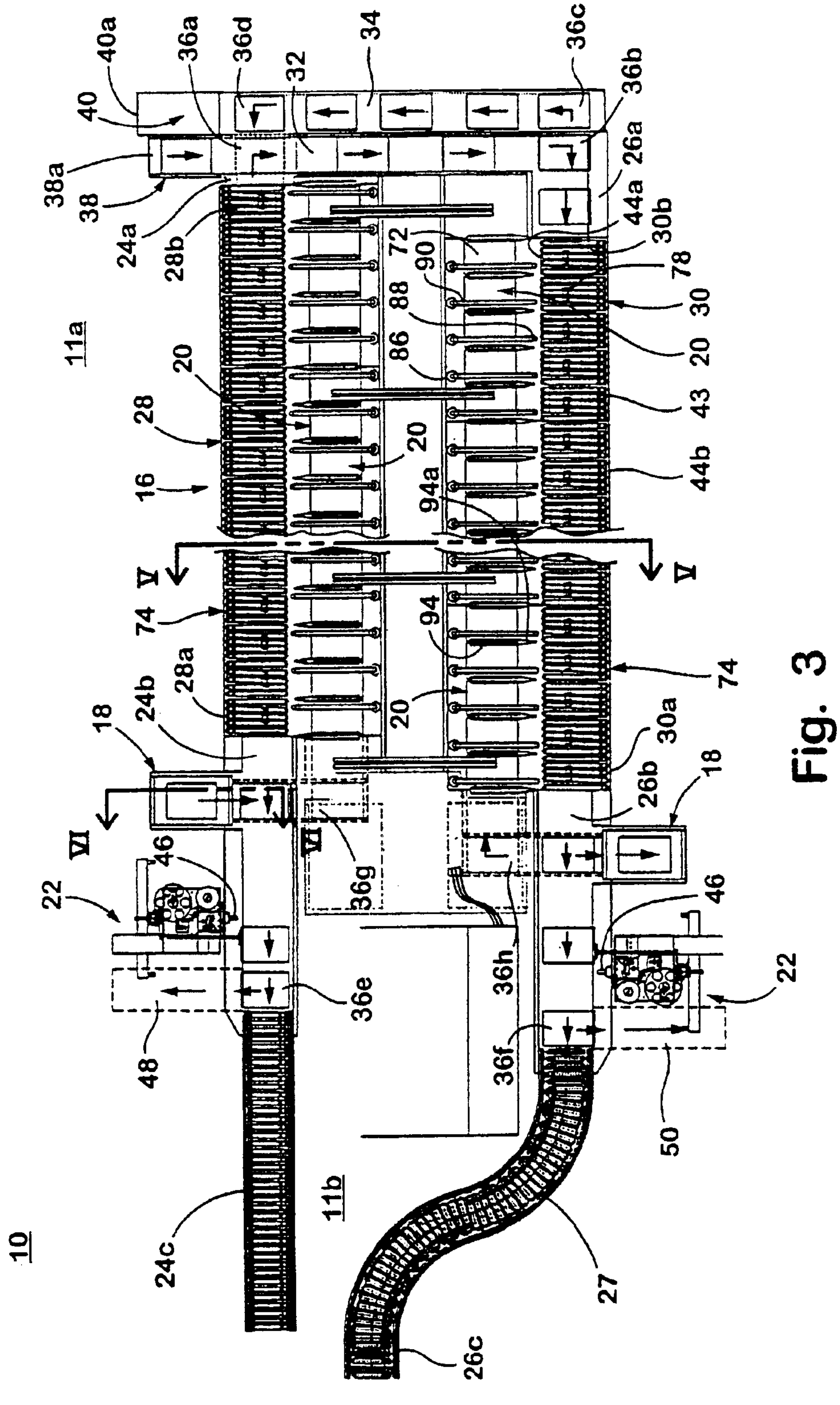
FIG. 3 is a top plan view of the automatic tray handling system of FIGS. 1 and 2, with the upper conveying surfaces partially cut away to reveal additional details.
Figure 4:
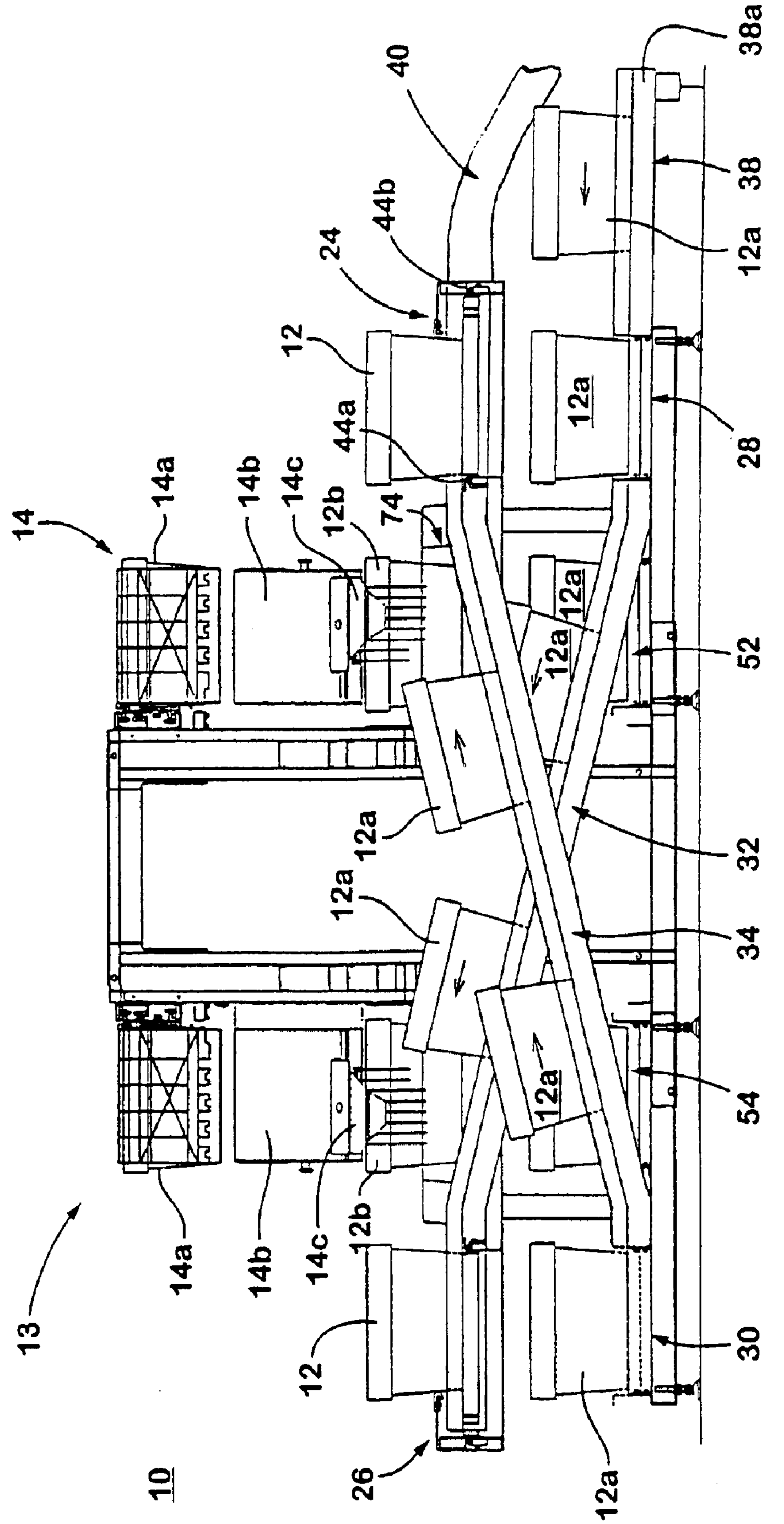
FIG. 4 is an end elevation of the tray handling system of the present invention, taken at the input end of the tray handling system.
Figure 10:
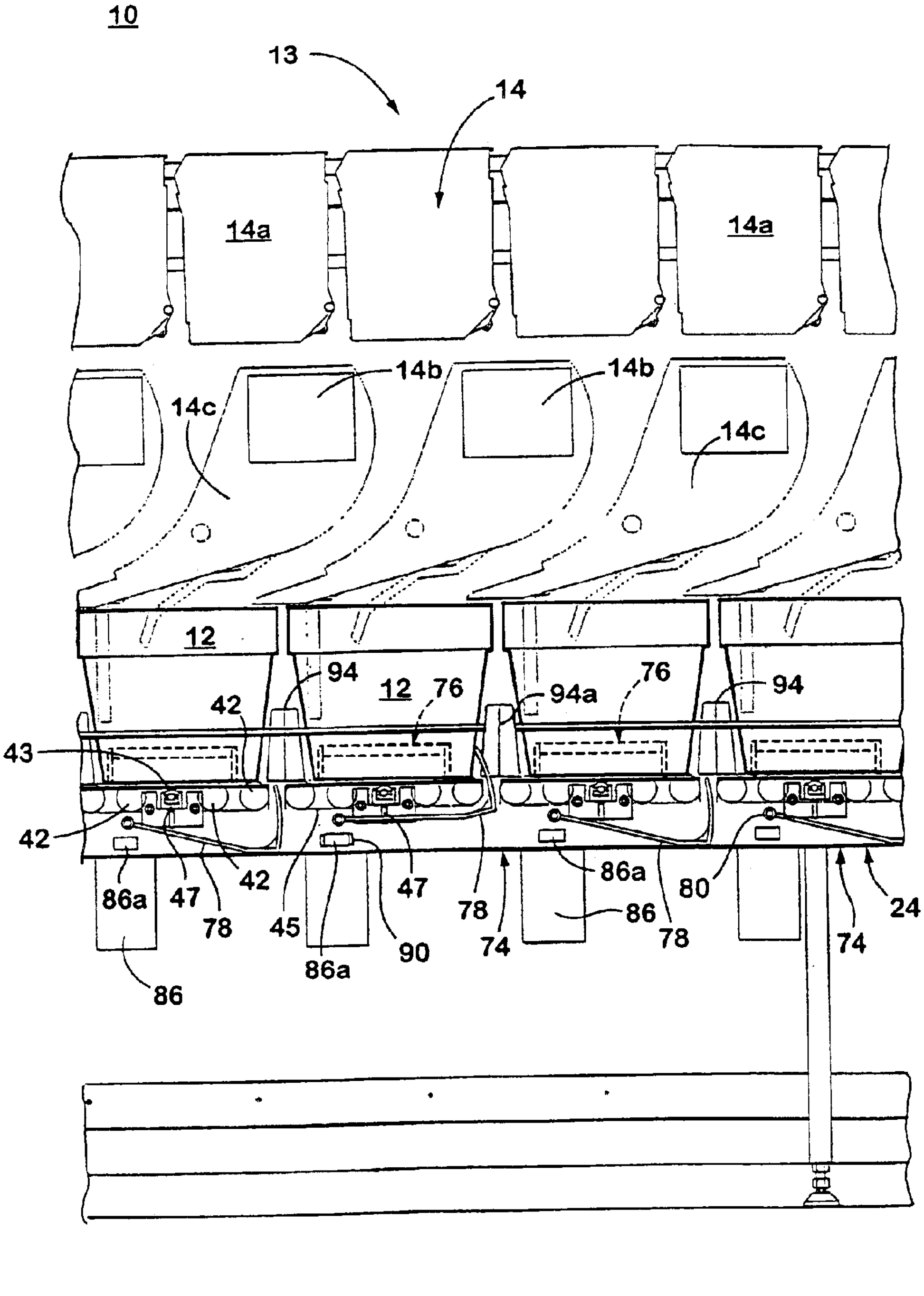
FIG. 10 is a side elevation of a portion of the tray handling system of the present invention.
Figure 11:
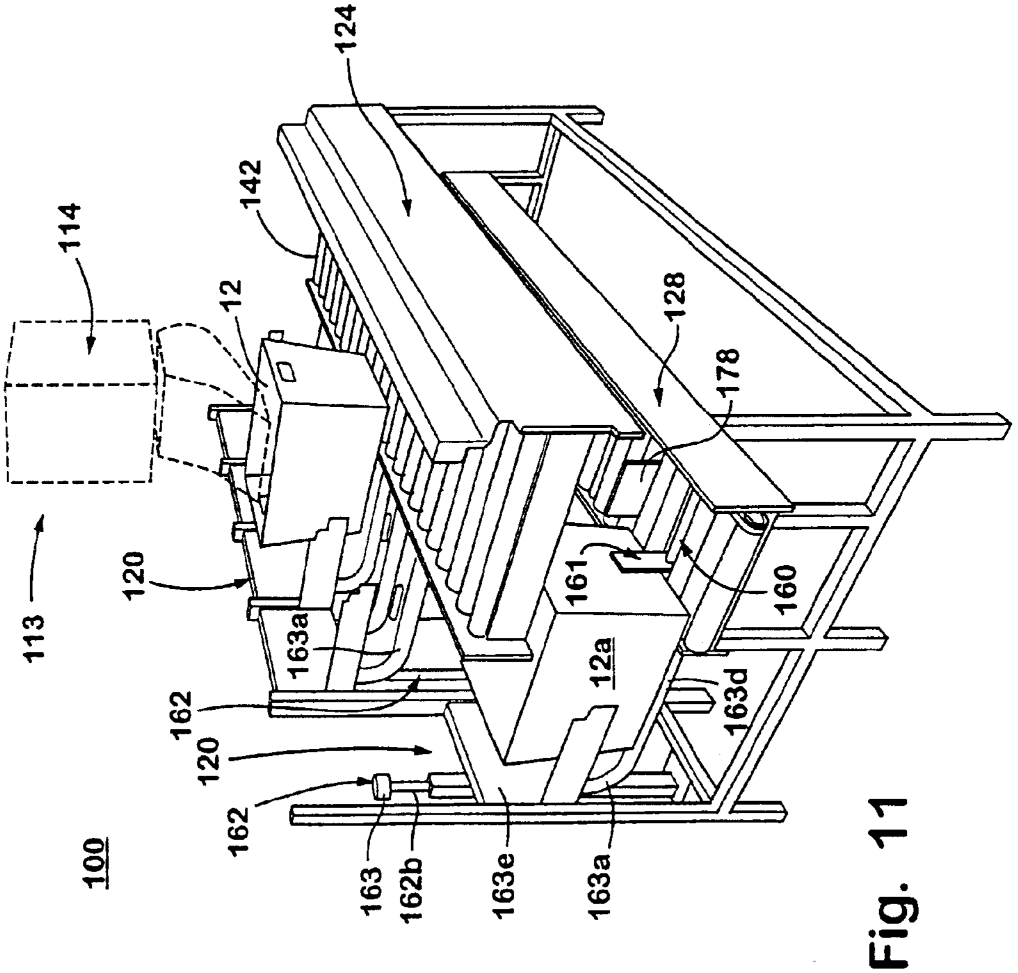
FIG. 11 is a perspective view of another embodiment of a tray handling system according to the present invention.

Upper conveyors 24 and 26 are preferably powered roller conveyors, which include a plurality of rollers 42 which are rotatably mounted along and between a pair of side walls of 44*a* and 44*b* of each conveying surface 24 and 26. The plurality of rollers 42 further includes multiple powered rollers 43 (FIG. 10), which are also connected to the sidewalls 44*a* and 44*b* and driven via an internal motor to cause rotation of the powered roller relative to the wall, as is known in the art of roller conveyors. The powered rollers 43 are connected to a plurality of non-driven rollers 42, such as to a pair of non driven rollers at either side of the powered roller 43, via one or more bands or belts 45 (FIGS. 8 and 10) to define individually driven zones, as is known in the art. Preferably, the powered rollers 43 are mounted to the side walls 44*a* and 44*b* by an axle mounting yoke 46 (FIG. 10) of the typed disclosed in commonly assigned, copending U.S. Pat. Application, Ser. No. 09/418,297, filed Oct. 14, 1999 by Schiesser et al. for AXLE HOLDING YOKE FOR CONVEYOR ROLLER, now U.S. Pat. No. 6,367,617, the disclosure of which is hereby incorporated herein by reference. However, any known means for mounting the rollers to the sidewalls of the conveyors may be implemented without affecting the scope of the present invention. Preferably, as shown in FIG. 3, at least some of the rollers 42 and 43 are mounted to sidewalls 44*a* and 44*b* at an angle or skewed, in order to assist in moving the partially filled trays from the tray moving devices 20 onto upper conveying surfaces 24, 26, such that the tray may be moved along the respective upper conveying surface 24, 26. Although shown and described as roller conveyors, conveying surfaces 16 may otherwise include belt conveyors, belt/chain driven rollers, line shaft driven rollers or the like, without affecting the scope of the present invention.

As shown in FIG. 2, trays 12 are conveyed along upper conveying surfaces 24 and 26 toward a downstream end 24*b* and 26*b*, respectively. Vertical tray moving devices 18 are positioned near or at the downstream ends 24*b* and 26*b* to remove empty trays 12*a* from the upper conveyors and move the empty trays onto an upstream end 28*a* and 30*a* of the lower conveyors 28 and 30, respectively, as discussed in detail below. Labeling stations 22 are positioned at or near a discharge end 24*c* and 26*c* of upper conveyors 24 and 26, respectively, and are operable to label the filled trays as they are conveyed toward discharge end 11*b* of automatic tray handling system 10. Preferably, one or both of the upper conveyors surfaces included a curved section 27, such that the discharge ends 24*c* and 26*c* of upper conveyors 24 and 26, respectively, are in close proximity, in order to reduce the manual labor of the system. Preferably, a scanner 46 is positioned at discharge ends 24*c* and 26*c* to verify the information contained on the label applied to the trays. Preferably, a pair of reject conveyors 48 and 50 are provided adjacent to discharge ends 24*c* and 26*c*, respectively, to allow incorrectly labeled trays to be discharged to a separate area via respective 90 degree transfer units 36*e* and 36*f* and reject conveyors 48 and 50.

Similar to upper conveyors 24 and 26, lower conveyors 28 and 30 are preferably powered roller conveyors which include a plurality of driven rollers 43 and non-driven rollers 42 rotatably mounted to a pair of parallel walls or frames 44. Lower conveyors 28 and 30 are preferably operable in a reverse direction from upper conveyors 24 and 26, to return the empty trays 12*a* back toward input end 11*a*. The 90 degree transfer units 36*a* and 36*c* are positioned at downstream ends 28*a* and 30*a* of conveyors 28 and 30, respectively, to move the empty trays onto the respective incline ramps 32 and 34 to transport the trays to the upper conveyors 24 and 26, respectively, at the other side of the sortation system 13.

In order to provide a continuous loop for the empty trays about the conveyor surfaces 16, vertical tray moving devices 18 are positioned at downstream ends 24*b*, 26*b* of upper conveyors 24, 26 and upstream ends 28*a*, 30*a* of lower conveyors 28, 30. As best shown in FIGS. 3 and 5–8, each vertical tray moving device 18 is operable to move an empty tray from the respective upper conveyor 24, 26, lower the tray to the level of the lower conveyors 28, 30, and then move the tray onto the respective lower conveyor 28, 30. Vertical tray moving device 18 includes an upper tray moving or pulling device 60, a vertical tray moving or lowering device 62 and a lower tray moving or pushing device 64, each of which is mounted to a frame or structure 66. Because the vertical tray moving devices 18 move and lower only empty trays, the devices may include lightweight supports and moving members, since they are supporting and/or moving only the lightweight unfilled trays, and need not include metal supports for strength in supporting the weight of filled trays.

Preferably, upper tray moving device 60 includes a driven belt, chain or the like 61, which includes at least one engaging member 61*a* for engaging and pushing and empty tray positioned at upper conveyor 24, 26 in a direction generally transverse to the direction of conveyance of the upper roller conveyors. Belt 61 is reeved about a driven roller or wheel 60*a*, which is operable to rotate and thus cause movement of belt 61, and a non-driven roller or wheel 60*b* spaced from driven wheel 60*a* and positioned generally over an opposite side of the respective upper conveyor 24, 26. Preferably, vertical tray moving device 18 includes a stop member 68, which is operable to engage a forward side of an empty tray 12*a* and temporarily prevent movement of the empty tray 12*a* along upper conveyor 24, 26, while engaging member 61*a* engages and moves the empty tray 12*a* off of conveyor 24, 26 and onto lowering device 62. Stop member 68 may include a raisable or pivotable arm which may extend up between an adjacent pair of rollers at vertical tray moving device 18 to engage and stop an empty tray being conveyed along upper conveyors 24, 26. Optionally, a pop-up 90 degree transfer unit may be positioned along conveying surfaces 24, 26 at vertical tray moving devices 18 to stop the empty trays at the conveyor and move the tray toward vertical tray moving device 18, without affecting the scope of the present invention.

Lowering device 62 of vertical tray moving device 18 preferably includes a pair of belts, chains or the like 63, each of which is reeved about a driven and non-driven wheel or roller 62*a* and 62*b*, respectively. Each belt 63 includes at least one, and preferably three, support members 63*a*, which receive the empty tray 12*a* thereon and support tray 12*a* while lowering the tray to the lower level. The driven wheels or rollers 62*a* are operable to rotate in an opposite direction relative to the other, with respect to the view of FIG. 7, such that support members 63*a* of each side of lowering device 62 are correspondingly moved in a downward direction to support and lower the empty tray 12*a*. Preferably, lowering device 62 includes the pair of belts and corresponding wheels/pulleys positioned at frame 66, such that there is a gap 67 between the support members 63*a* of each lowering belt 63.

Figure 8:
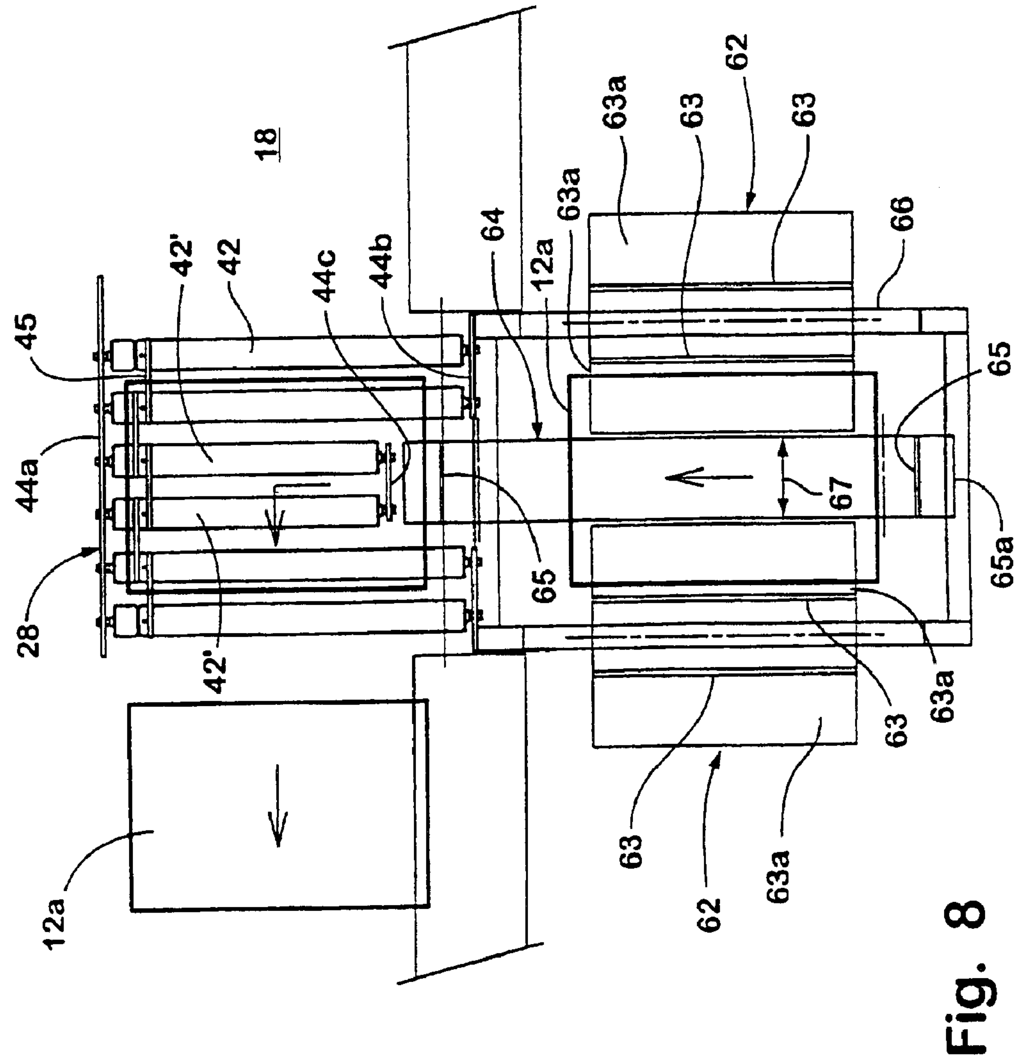
FIG. 8 is a top plan view of the vertical tray-moving device of FIGS. 6 and 7.

Lower moving device 64 is positioned in gap 67 between lowering support members 63*a* and includes a continuous belt 65, which is movable about a driven and non-driven roller 64*a* and 64*b*, respectively, such that at least one engaging member 65*a* contacts a side of empty tray 12*a* and pushes or otherwise moves tray 12*a* off of support members 63*a* of lowering device 62 and onto the respective lower conveying surface 28, 30. Preferably, as best shown in FIG. 8, lower conveyor 28 includes one or more, and preferably a pair of, shorter rollers 42' which are mounted to inner wall 44*a* of lower conveyor 28, along with rollers 42 and 43. Shorter rollers 42' are mounted at an outer end to an outer bracket 44*c* which is laterally inset from outer wall 44*b*, in order to provide clearance for lower tray moving device 64, such that the empty tray may be moved out and fully onto the rollers 42 and 42' of lower conveyor 28 by lower tray moving device 64.

Preferably, each tray moving device 60, 62 and 64 of vertical moving devices 18 is operable to move the corresponding belt and engaging members in one direction. Each moving device preferably includes two or more engaging or support members along the respective belts, such that as one of the engaging or support members moves a tray via movement of the belts, another engaging or support member is correspondingly moved into position to engage or support the next empty tray. Upper tray moving device 60 is operable to move belt 61 in response to an empty tray being detected at vertical tray moving device 18. Preferably, automatic tray handling system 10 is operable to identify and track filled or partially filled trays as they move along upper conveying surfaces 24 and 26, as discussed below. The system is further operable to allow the tracked trays to pass by vertical tray moving devices 18 for labeling and discharge at discharge end 11*b*, while stopping empty or non-tracked trays at the vertical tray moving devices 18. Optionally, vertical tray moving device 18 may include an optical sensor or scanner 70 to detect the tray and/or determine the status of the tray being conveyed along of the conveyors 28 and 30, or may otherwise determine when a tray approaching the vertical tray moving device is an empty or filled tray, without affecting the scope of the present invention.

Preferably, vertical tray moving device 18 is first operable to raise or otherwise engage stop member 68 with the empty tray to prevent further movement along the upper conveyor, while engaging member 61*a* engages and pushes the tray off of the upper conveyor and onto the supports 63*a* of lowering device 62. Lowering device 62 is then operable to lower the tray in response to the tray being positioned on the support member 63*a*. When activated, lowering device moves a predetermined amount to move the tray from the upper level to the lower level. Lower tray moving device 64 is then operable to move engaging member 65*a* into contact with the empty tray at the lower level to push the tray off of the lower support member 63*a* and onto shorter rollers 42' and adjacent rollers 42 of the lower conveyor. Lower moving device 64 is operable in response to the tray being detected at the lower level, or may be actuated subsequent to each actuation of lowering device 62, which may also be automatically actuated subsequent to actuation of the upper tray moving device 60.

Figure 15:
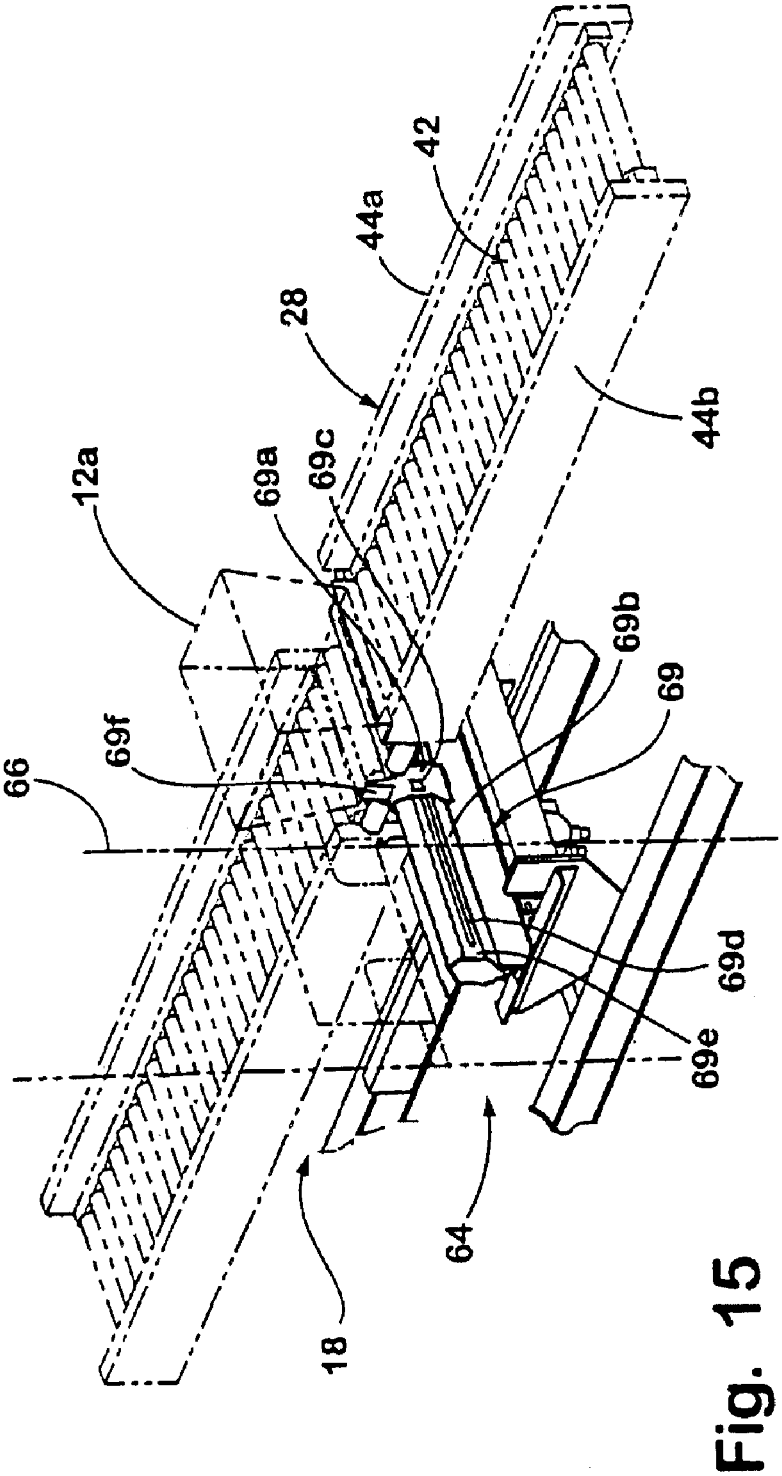
FIG. 15 is a perspective view of a linear actuator useful with the present invention, as positioned at a lower portion of a vertical tray moving device.

Although shown and described as including movable belt devices for moving the tray off of the upper conveyor, lowering the tray to a level of the lower conveyor, and moving the tray onto the lower conveyor, clearly the scope of the present invention includes other means for automatically removing a tray from the upper conveyor and placing it at the lower conveyor, such as movable arms or bars which engage the tray and push/pull the tray in the desired direction or extendable and retractable devices which extend or retract to move the tray in the desired direction, or the like. It is further envisioned that vertical tray moving device may include one or more linear actuators 69 (FIG. 15), which are operable to engage and move the empty tray from upper conveyer 24, 26 and/or onto lower conveyor 28, 30, without affecting the scope of the present invention. Linear actuator 69 is preferably of the type disclosed in commonly assigned U.S. Provisional Pat. Application Ser. No. 60/166,079, filed Nov. 17, 1999 for LINEAR ACTUATOR, by Schiesser et al., the disclosure of which is hereby incorporated herein by reference. Linear actuator 69 includes a carriage member 69*a*, which is slidable along a track or guide member 69*b*. The carriage 69*a* includes an engaging member 69*f*, which is operable to engage and move the empty tray toward and/or away from vertical tray moving device 18, and in a direction generally normal to a direction of conveyance of the respective conveying surface 24, 26, 28 or 30. For example, linear actuator 69 may be positioned within frame 66 at a lower end thereof, with engaging member 69*f* extending upwardly therefrom, and thus be operable to push the empty trays onto lower conveying surface 28, 30 (as shown in FIG. 15). Additionally, linear actuator 69 may be positioned at an upper end of frame 66, with an engaging member extending downwardly from the carriage to engage an upper portion of the empty trays as they are conveyed along the upper conveying surface 24, 26. Carriage 69*a* is movable along guide member 69*b* in response to actuation of a linear motor or actuator 69*c*. Preferably, linear motor 69*c* is positioned at carriage 69*a*, while a conductor plate or strip 69*d*, which forms the secondary side of linear motor 69*c*, is secured along a surface 69*e* of guide member 69*b*. Preferably, linear motor 69*c* is a conventional linear motor such as a linear motor which is commercially available and manufactured by Mannesmann, Baldor/Normag and others.

Automatic tray handling system 10 is thus operable to move or convey empty trays throughout a continuous loop from one of the induct stations 38, 40. The empty trays are conveyed along the conveying surfaces 16 and moved by the vertical tray moving devices 18 until the empty tray is selected to be filled by one of the sorter units 14. For example, an empty tray may be placed on induct station 38 and moved across lower conveyor 28 via 90 degree transfer unit 36*a*, up incline ramp 32 and onto upper conveyor 26, via 90 degree transfer unit 36*b*. The empty trays conveyed along upper conveyor 26, if not selected and captured by one of the moving devices 20, as discussed below, are then vertically moved or returned down to lower conveyor 30 by one of the two vertical tray moving devices 18. The empty tray is then conveyed back along lower conveyor 30 and onto the second incline ramp 34 via 90 degree transfer unit 36*c*. The tray is conveyed up the incline ramp 34 and onto upper conveyor 24 via 90 degree transfer unit 36*d*. If the empty tray is not selected for filling at one of the sorter units 14 along upper conveyor 24, the empty tray is moved to lower conveyor 28 by the vertical tray moving device 18, where the tray is again conveyed back along lower conveyor 28 and onto the first incline ramp 32, thereby completing the loop of automatic tray handling system 10.

Figure 5:
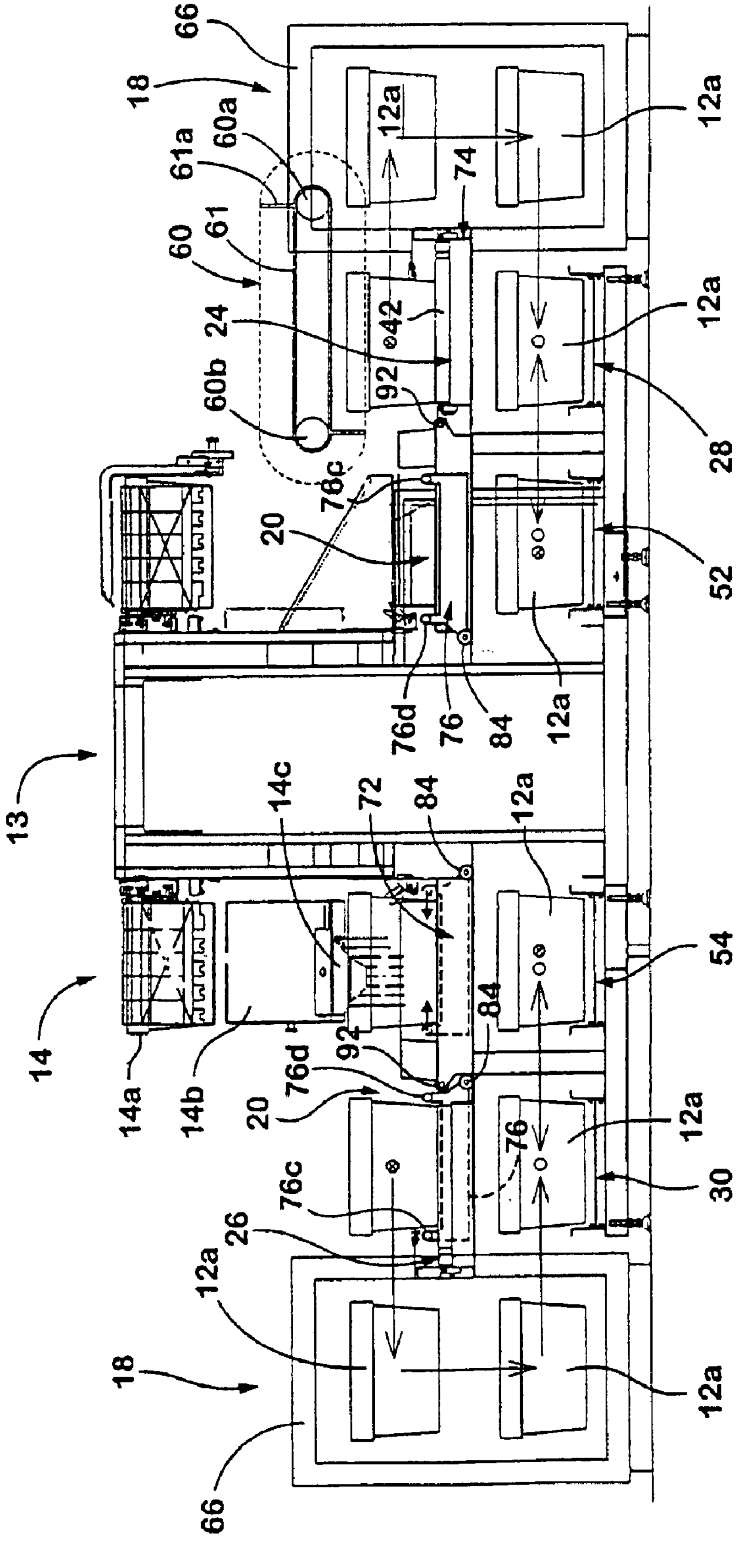
FIG. 5 is a partial sectional view of the tray handling system, taken along the line V—V in FIG. 3.
Figure 6:
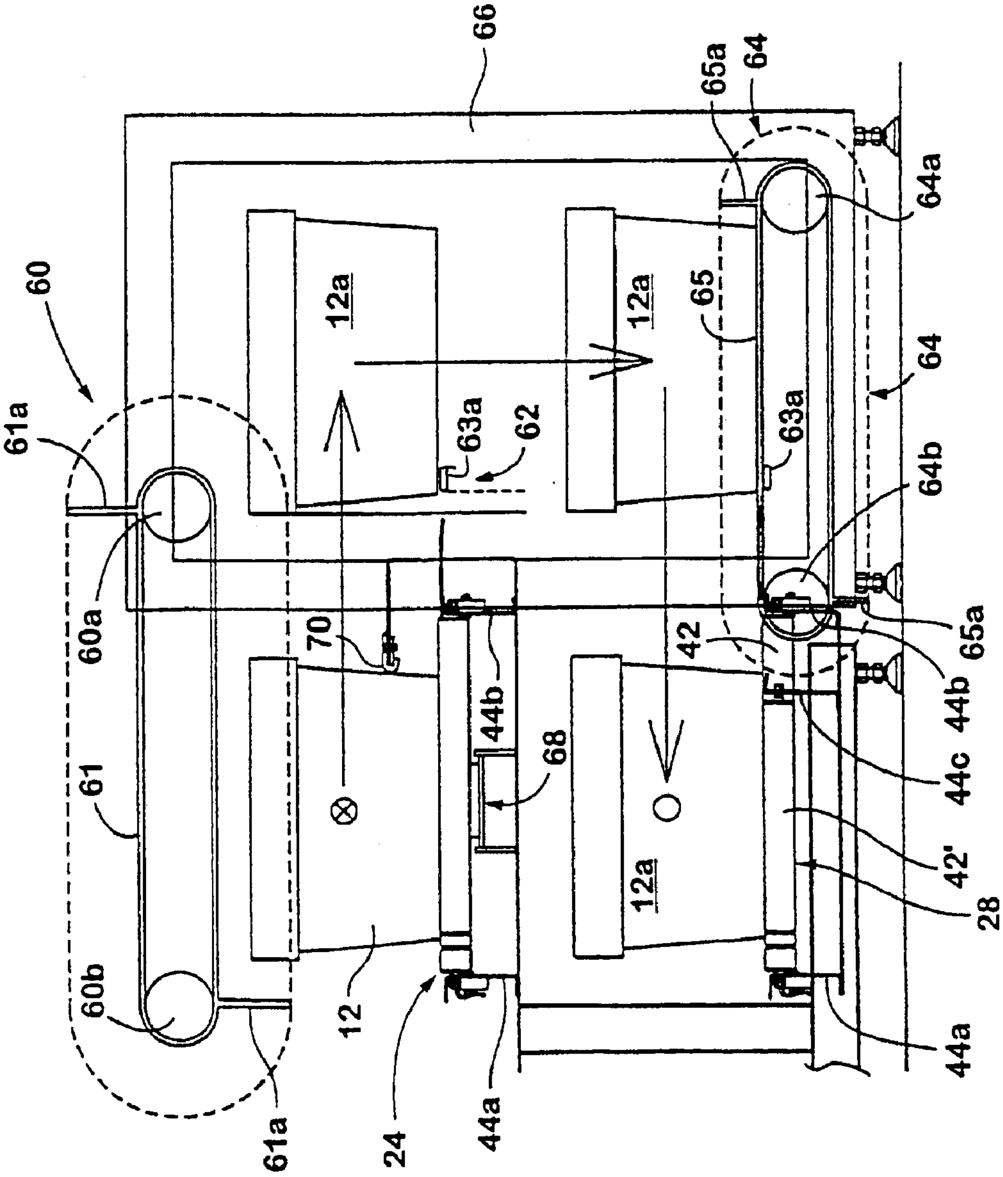
FIG. 6 is a partial sectional view of a vertical tray-moving device useful with the present invention, taken along the line VI—VI in FIG. 3.
Figure 7:
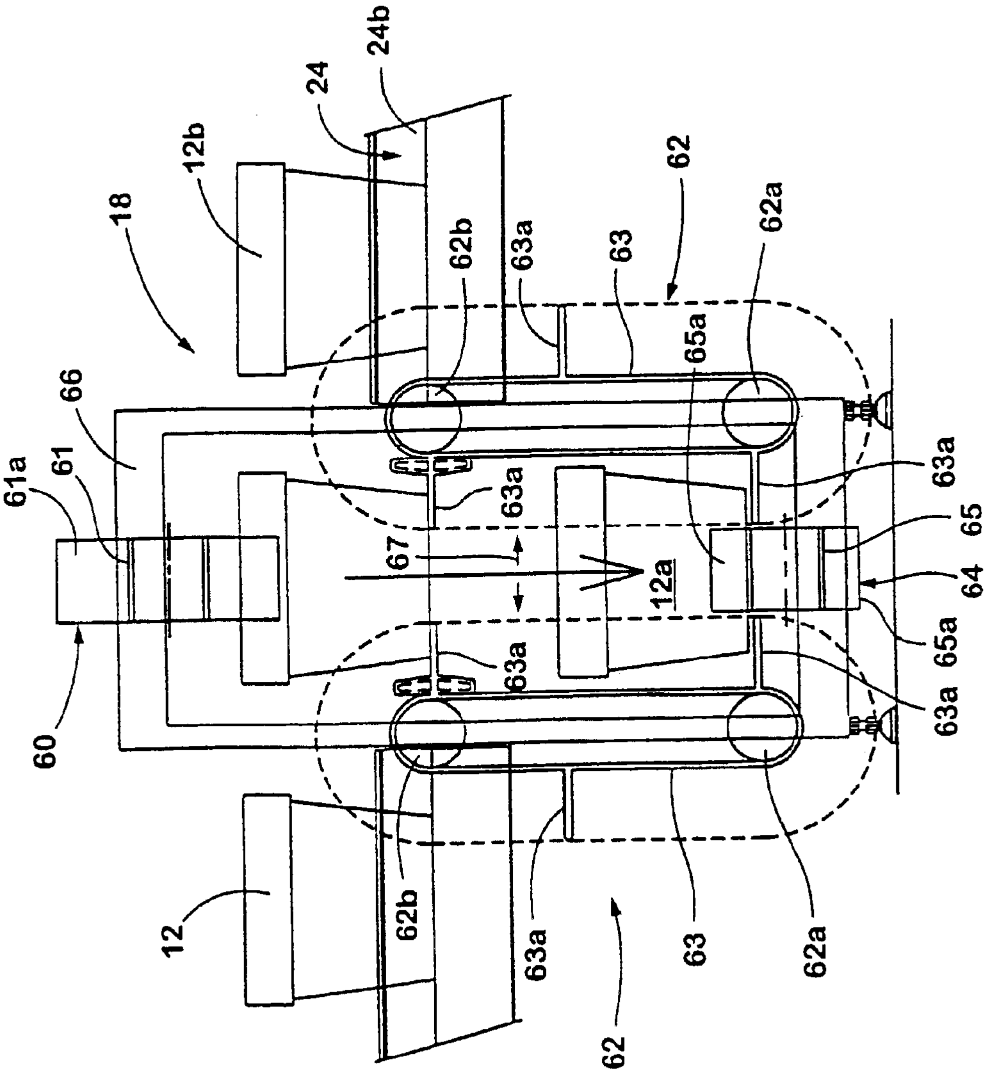
FIG. 7 is a side elevation of the vertical tray-moving device of FIG. 6.

Preferably, automatic tray handling system 10 further includes a pair of buffer conveyors 52 and 54 positioned along each inward side of lower conveyors 28 and 30, respectively, and generally beneath the sorter units 14, as best seen in FIGS. 3 and 5. Buffer conveyors 52 and 54 provide temporary storage for additional empty trays 12*a*, which may be discharged from buffer trays 52, 54 onto upstream ends 28*a*, 30*a* of lower conveyors 28, 30, respectively, via a pair of 90 degrees transfer units 36*g* and 36*h*. Preferably, empty trays 12*a* may be inducted onto buffer conveyors 52 and 54 as the automatic tray handling system 10 attains full capacity of trays moving therealong. The empty trays may be discharged from buffer conveyors 52 and 54 onto lower conveyors 28 and 30 in response to a reduced number of trays being conveyed along conveying surfaces 16, since additional trays may then be needed along tray handling system 10.

Buffer conveyors 52, 54 preferably include index chain drive conveyors, which may move an incremental amount in one direction to load one or more trays onto buffer conveyors 52, 54, and then may move an incremental amount in the opposite direction to discharge one or more trays onto lower conveyors 28 and 30 as needed. Buffer conveyors 52, 54 are thus preferably operable in a last in, first out (LIFO) mode of operation, whereby the last tray to be inducted onto the buffer conveyors 52, 54 is the first tray to be discharged therefrom as additional trays are needed along conveyors 16 of automatic tray handling system 10. The buffer conveyors 52, 54 thus provide additional capacity of trays for the system, such that empty trays 12*a* need not be inducted at induct stations 38 and 40 as rapidly in order to facilitate full capacity operation of automatic tray handling system 10. Although shown and described as an index chain drive conveyor, clearly other conveying means may be implemented for the buffer conveyors, such as belt conveyors, roller conveyors or the like, without affecting the scope of the present invention. It is further envisioned that the buffer conveyor may receive empty trays at one end, such as at upstream end 28*a*, 30*a* of lower conveyors 28, 30, and discharge the trays at an opposite end, such as at downstream end 28*b*, 30*b* of lower conveyor 28, 30.

Figures 9A, 9B:
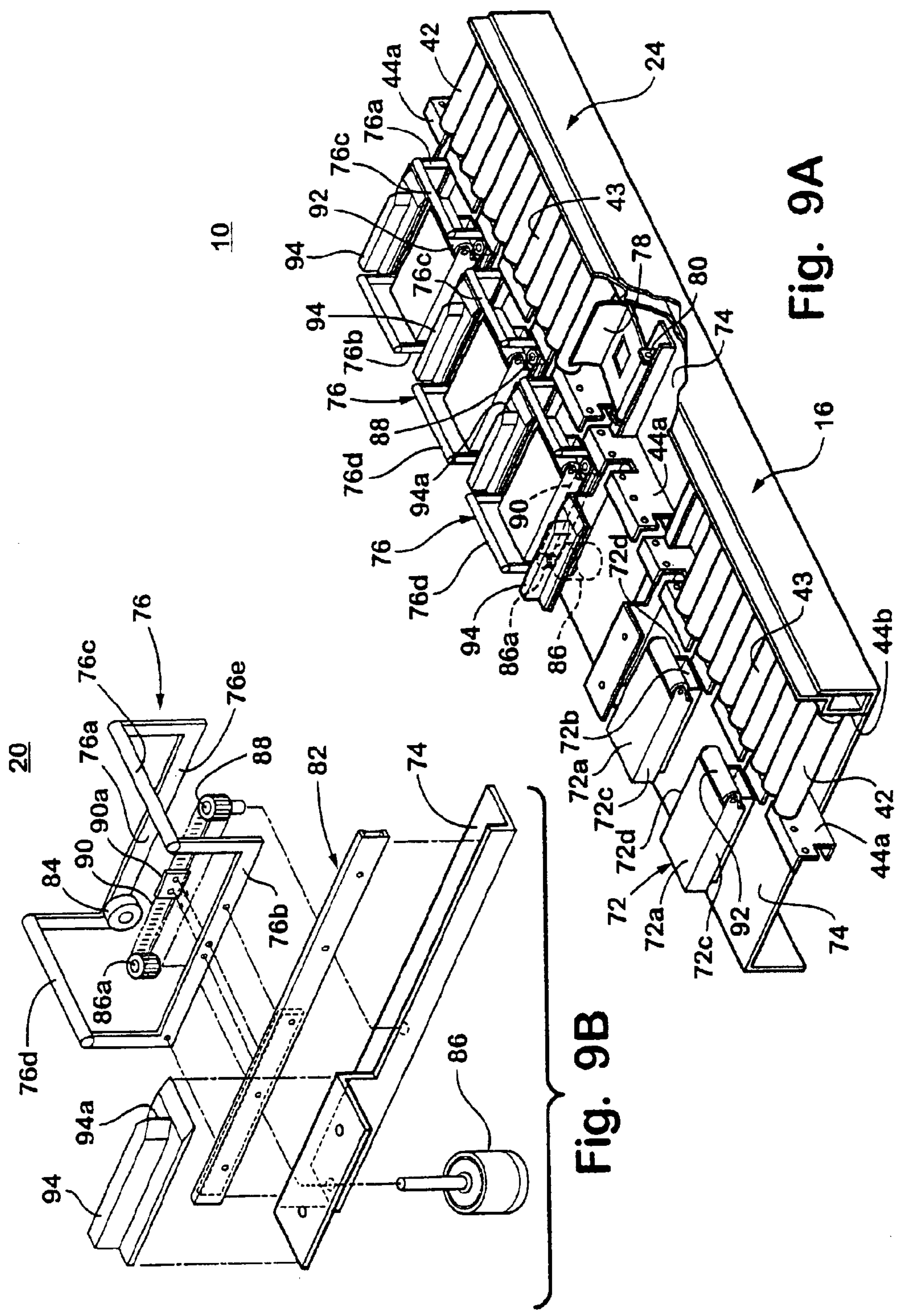
FIG. 9A is a perspective view of a section of the upper conveyor and a tray moving and support apparatus useful with the present invention, with a portion of the conveyor cut away.
FIG. 9B is an exploded perspective view of the tray moving apparatus of FIG. 9A.

Referring now to FIGS. 5, 9A and 9B, tray moving devices 20 are positioned at each sorter unit 14 and are operable to stop an empty tray as it moves along the upper conveyor 24 or 26 and pull the tray onto a tray support 72 for filling at the respective sorter 14. Each tray moving device 20 is further operable to move or push the filled or partially filled tray from the tray support 72 back onto the rollers 42 of the upper conveyor. Inner wall or bracket 44*a* for rollers 42 is secured along a frame or platform 74, which provides an outer rail for attachment of outer wall 44*b* for mounting the opposite end of rollers 42 thereto. Tray moving device 20 includes a tray push/pull member 76, a stop member 78 and tray support 72. Preferably, tray stop member 78 includes a curved arm or bracket, which is pivotably mounted to a support bracket 80, such that an upper end 78*a* of tray stop 78 is raisable between a pair of adjacent rollers 42, 43 to engage and stop an empty tray from moving along the respective upper conveyor, while the tray push/pull member 76 engages and moves the tray off of the upper conveyor and onto the tray support 72. Stop member 78 may be pivotable via any known means, such as by a rotary motor, a spring biased system, or any other means to raise stop member 78, without affecting the scope of the present invention.

Preferably, as best seen in FIG. 9B, tray push/pull member 76 includes a pair of generally "U" shaped side frames 76*a*, 76*b*, which are interconnected at an upper end of each frame by a tray engaging or pulling member 76*c* at one end and a second tray engaging or pushing member 76*d* at the other end. Preferably, one side frame 76*b* of tray moving member 76 is slidably supported along frame 80 via a ball slide or track 82 or the like. The opposite side frame 76*a* is supported at one end by a wheel or roller 84, which rotatably engages lower frame or platform 74 of the upper conveyor as the tray moving member 76 is extended and retracted therealong. An outer end 76*e* of side frame 76*a* is not supported by a roller or slide, in order to provide clearance over stop member 78 as the tray moving member 76 is moved outwardly, such that tray engaging member 76*c* is moved across and over the rollers 42 of the upper conveying surface.

Tray moving member 76 is preferably movable relative to frame 74 via a stepper motor 86 or the like. Stepper motor

86 includes a drive sprocket 86*a*, while frame 74 includes a cog sheave or spool 88, such that a timing belt 90 is routed and movable about drive sprocket 86*a* and spool 88 in response to actuation of stepper motor 86. As shown in FIG. 9B, timing belt 90 includes an attachment plate 90*a*, which is secured to side frame 76*b* of tray moving member 76, such that movement of timing belt 90 results in a corresponding movement of tray moving member 76. Clearly, however, other means for moving a tray stop and/or engaging member may be implemented without affecting the scope of the present invention.

As shown in FIG. 9A, tray support 72 provides a support platform 72*a* for supporting a tray while the tray is being filled by a respective sorter unit 14. Because the filled trays are always supported by support 72 or conveyors 24 and 26, the trays for use with the present invention need not require rigid side walls to withstand clamping or grabbing of the trays when they are filled. Tray support 72 is preferably formed such that a lower surface 72*b* is mountable to the platform of the upper conveyor while the sidewalls 72*c* and 72*d* are formed to provide clearance to stepper motor 86 and timing belt 90 and/or sideframes 76*b* and 76*a* of the tray moving member 76. Preferably, tray support 72 further includes a transition roller 92, which is rotatably mounted at tray support 72 and positioned between support platform 72*a* and rollers 42, 43 of the upper conveying surface. Transition roller 92 is oriented generally normal to rollers 42, 43 and is preferably positioned such that an upper surface of transition roller 92 is at a same level as an upper surface of the rollers 42, 43 of the upper conveying surface. Transition roller 92 thus provides rolling support of the tray as it is moved between the upper conveying surface and the tray support platform 72*a*. Additionally, a tray guide member 94 may be positioned at an upper end of frame 74 and between a pair of adjacent tray supports 72. Guide member 94 includes a tapered guide end 94*a*, which functions to assist in guiding the empty trays into proper position on the support surfaces 72*a*, as they are moved toward tray supports 72 by tray engaging members 76*c* of tray moving members 76.

The present invention further includes a control system (not shown in detail), which is operable to actuate the driven rollers 43 of the conveying surfaces 16 and to actuate the tray moving devices 20 and the vertical tray moving devices 18 at appropriate times. Preferably, the control system is interconnected with a control system of the sortation system. The control system is operable to electronically identify a tray as it is being filled by a sorter unit and track the identified tray along upper conveying surfaces 24 and 26. Tray handling system 10 is thus operable to allow the identified filled trays to move along the upper conveying surfaces past the vertical tray moving devices 18, while empty trays, which are not electronically identified and tracked by the control system, are stopped and lowered by the vertical tray moving devices 18. Additionally, the identification and tracking of the filled trays prevents the downstream tray moving devices 20 from stopping and filling an already filled tray, since such trays are identified and allowed to move along the conveying surface all the way to labeler 22 at discharge end 11*b* of tray handling system 10. When the filled or at least partially filled trays arrive at the labeling station, the labelers 22 are operable to print a label and attach the label to the appropriate tray. As the tray proceeds along the conveying surface toward the discharge end, scanner 46 verifies that the information contained on the label matches the identification of that particular tray, and if the information is correct, the tray handling system allows the tray to continue towards the discharge end 24*c*, 26*c* of the conveying surface 24, 26. If incorrect label data is detected, the tray is transferred to the reject conveyors 48 and 50 via the transfer units 36*e* and 36*f* near the discharge end 24*c* and 26*c* of the conveying surfaces 24 and 26, respectively.

When automatic tray handling system 10 is first started, the system must initially be charged or filled with empty trays. Preferably, empty trays are inducted onto the automatic tray handling system by manually placing the trays at one or both of the induction stations 38 and 40 at the upstream or induct end of the upper conveyors 24, 26. Alternately, or additionally, as shown in FIG. 2, empty trays may be inducted onto the upstream ends 28*a* and 30*a* of the lower conveying surfaces 28 and 30 via an induction station 19 at each vertical tray moving device 18. Optionally, empty trays may be manually placed along the conveying surfaces 16, such as along the lower conveying surfaces 28 and 30. Initially, as empty trays are inducted into the system, empty trays are lowered by the vertical tray moving devices 18 onto the lower conveying surface, or input directly at induction stations 19 of moving devices 18, and transferred across the lower conveying surfaces and into the buffer conveyors 52 and 54 via transfer units 36*g* and 36*h* at upstream ends 28*a* and 30*a* of lower conveyors 28 and 30, respectively. The trays will be moved onto the buffer conveyors one tray position at a time until the buffer conveyors are approximately filled with trays. After the buffer conveyors are full, empty trays are continued to be loaded at the induction stations 38 and 40 and conveyed about the conveying surfaces 16 of the tray handling system 10. Preferably, empty trays will be loaded into the tray handling system until the lower conveying surfaces 28 and 30 are both approximately 90 percent full. Alternately, for the preloading operation and for convenience, empty trays may be manually loaded directly onto the lower conveying surfaces 28 and 30 along their entire length or within 90 percent of their capacity.

Once the system is preloaded with empty trays, the normal operation of automatic tray handling system 10 may begin. During normal operation, empty trays may be loaded onto the induct stations 38 and 40 or directly onto the lower conveying surfaces 28 or 30. Preferably, the present invention is operable to release empty trays from the lower conveying surfaces 28 and 30 such that there is approximately a 10-foot gap between each adjacent pair of empty trays along upper conveying surfaces 24 and 26. This provides a sufficient time delay between trays to allow time for the tray to be stopped and moved off of the conveying surface by the tray moving devices 20 or vertical tray moving devices 18, and to allow sufficient space between consecutive empty trays for filled trays to be inducted onto the conveying surface from one of the sorter units. Based on a total machine normal output of five trays per minute, this gap ensures that nearly twice the required number of trays are made available during each minute of operation. The empty trays then are moved up the incline belts and onto the upper conveyor surfaces for selection and capture by the tray moving devices 20 at each sorter unit. The empty trays will automatically and continuously be conveyed toward the discharge end of the upper conveying surfaces until they are required to replace a discharged full tray at a sorter unit 14. If the empty tray is not required or selected to replace a full tray, the empty tray will continue the loop via the vertical tray moving devices 18, whereby they will accumulate on the lower conveying surface and cycle through the system again.

When a full tray is ready to be discharged from the sorter unit 14, the control will wait until an empty tray passes the corresponding sorter unit and then will activate tray moving device 20 to push the full tray out onto the respective upper conveying surface 24 or 26. The tray moving device 20 is operable to lower the stop arm 78 out of the way at the end of its push cycle to allow the full tray to convey toward the discharge end of the upper conveying surface 24 or 26. As soon as the full tray is clear of the stop member 78, the stop member 78 is again operable to raise and capture the next oncoming and/or available empty tray, such that the tray moving device may pull the empty tray onto the tray support 72 for filling by the corresponding sorter unit. The filled trays are then conveyed along the upper conveying surfaces 24, 26 and are labeled and discharged at discharge end 11*b* of tray handling system 10.

Preferably, as a tray is discharged from a particular sorter unit 14, the control selects and reserves the next available empty tray inducted onto the conveying surfaces 16 for that particular sorter unit. The sorter unit may not capture the next empty tray that passes thereby, since this tray may already be selected and reserved for another sorter unit which discharged its filled tray prior to the other sorter unit. Accordingly, the control is preferably operable in a "first come, first served" mode of operation, which precludes a sorter unit at a downstream end of one of the upper conveying surfaces 24 and 26 from waiting a prolonged period of time until an empty tray is not captured at any of the upstream sorter units. Any empty trays not captured and filled by any of the sorter units during the pass in front of the sorter units will be transferred onto the lower conveyor units 28 and 30 via the vertical tray moving devices 18 located at the downstream end of the upper conveyors 24 and 26. The empty trays are repeatedly conveyed about the continuous loop of conveying surfaces 16 until the empty tray is captured and filled at one of the sorter units 14 of sortation system 13.

The present invention is also operable in a sweep process, whereby the tray handling system is purged of filled and/or partially filled trays and each sorter unit is provided with a new empty tray. During the sweep process, the mail delivery or supply system will deliver all of the inducted mail to the sorters or into a reject bin. As the mail is delivered during the sweep process, no additional empty trays will be released from the respective lower conveying surfaces 28 or 30, such that the upper conveying surfaces 24 and 26 can be cleared of empty trays. All of the full trays will then be discharged from their respective sorter unit onto the upper conveying surfaces and conveyed to the labeler for labeling and discharge from the automatic tray handling system. After all of the at least partially filled trays have been discharged from the system, empty trays will be released and will be captured and pulled onto tray supports at each sorter unit, preferably in the order that the empty trays encounter the sorter unit, until all of the sorter units have been replenished with empty trays. As soon as the bins have been replenished with empty trays, the next sorting cycle can begin. Any full trays remaining on the upper conveying surfaces 24 and 26 will continue toward the labelers. Once the final remaining full trays are clear of the labelers, the empty trays will again be allowed to re-circulate through the automatic tray handling system as described above. Preferably, the lower conveyors 28 and 30 and the buffer conveyors 52 and 54 hold a sufficient number of empty trays to facilitate replenishing of empty trays at each mail sorter 14 without requiring additional empty trays to be manually inducted onto the system during a sweep operation.

Although shown and described as having a continuous loop along both sides of the sortation system 13, it is envisioned that the incline ramps 32 and 34 of tray handling system 10 may be replaced by an empty tray raising device, without affecting the scope of the present invention. The empty tray raising devices are then operable to remove empty trays from the downstream end of lower conveying surfaces, raise the trays upward, and induct or return the empty trays onto the upstream end of the upper conveying surfaces, in a similar manner that the trays are lowered by the vertical tray moving devices 18. The empty trays would then be movable about a separate continuous loop along each side of sortation machine or system.

Referring now to FIGS. 11–14, an automatic tray handling system 100 is operable to move empty trays 112*a* from an empty tray conveyor 128 to an appropriate mail sorter 114 for filling, and then to move the at least partially filled trays 112*b* from the mail sorter onto a full tray takeaway conveyor 124. Preferably, empty tray conveyor 128 is positioned along and below full tray conveyor 124, such that the empty trays are moved upwardly from a lower level to an upper level at the sorter units 114 by a tray moving device 120 positioned at each sorter unit 114. However, the empty tray conveyor may be positioned above the full tray take away conveyor, without affecting the scope of the present invention. Preferably, automatic tray handling system 100 is applicable to a sortation system 113, which includes one or more rows of sorter units 114, similar to sortation system 13, discussed above and as known in the art. An upper, full tray conveyor 124 and a lower, empty tray conveyor 128 are then positioned along each row of sorter units at each side of sortation system 113.

Figure 14:
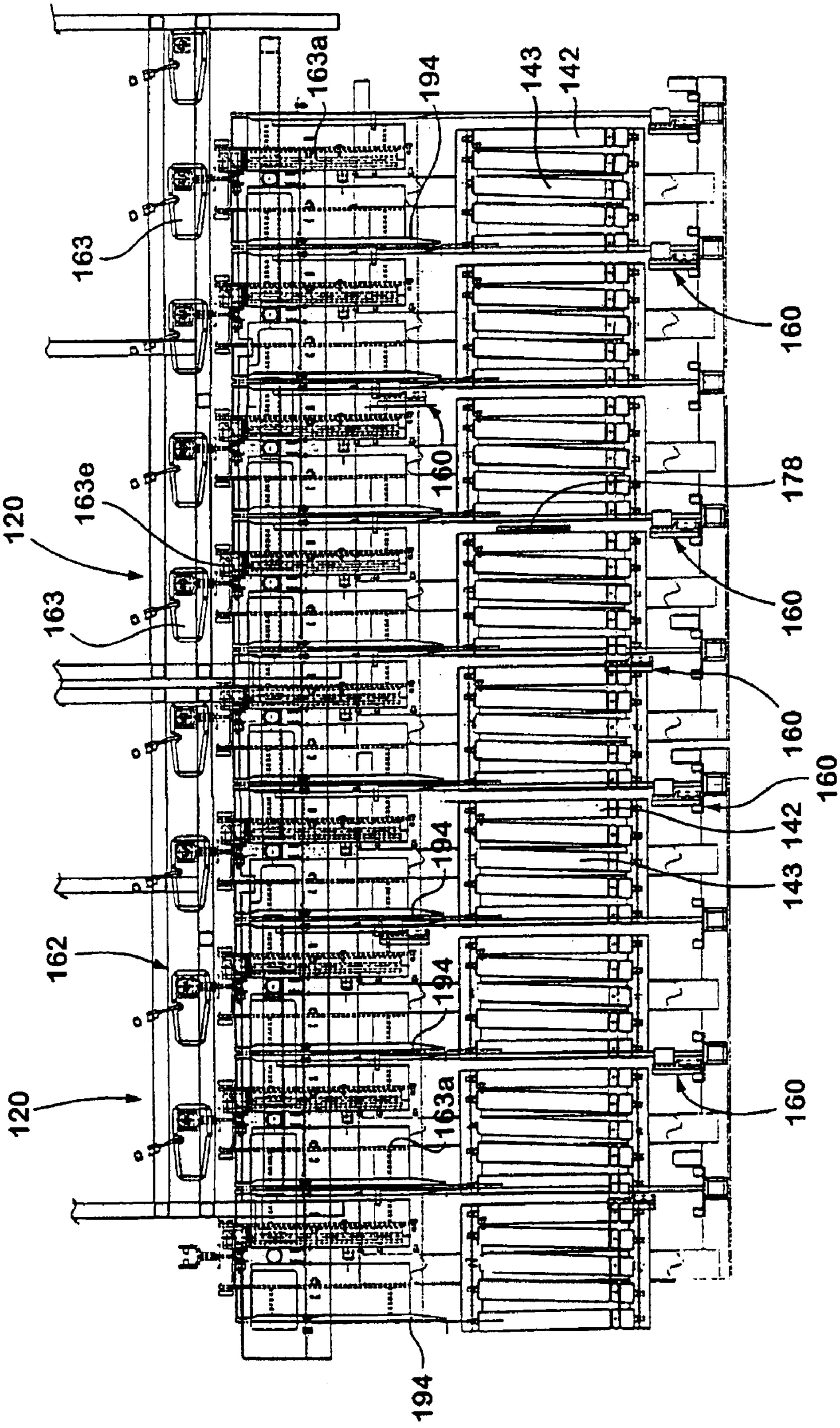
FIG. 14 is a top plan view of a portion of the tray handling system shown in FIG. 13.

Both of the empty tray conveyor 128 and full tray conveyor 124 preferably comprise powered roller conveyors, similar to upper and lower conveying surfaces 24, 26, 28 and 30, discussed above. Preferably, as best shown in FIG. 14, several of the rollers 142 of the upper, full tray conveyor 124 are angled or skewed along the conveyor path to assist the tray handling system in moving the full tray out from the sorter unit and onto the upper conveyor 124.

Automatic tray handling system 100 preferably includes at least one induction station (not shown) positioned at an induct end or upstream end of empty tray conveyor 128, while a labeling and discharge area (also not shown) are positioned at a downstream or discharge end of each upper full tray conveyor 124. Preferably, the induct stations, labelers and discharge stations are substantially similar to induct stations 38, 40, labelers 22, and discharge end 11*b* of automatic tray handling system 10, discussed above, such that a detailed description will not be repeated herein. As the operators are loading the empty trays onto the induct stations, the operators may orient the trays such that a label holder is properly positioned to receive the label onto the tray at the labeling station at the discharge end of the tray handling system.

Figure 12:
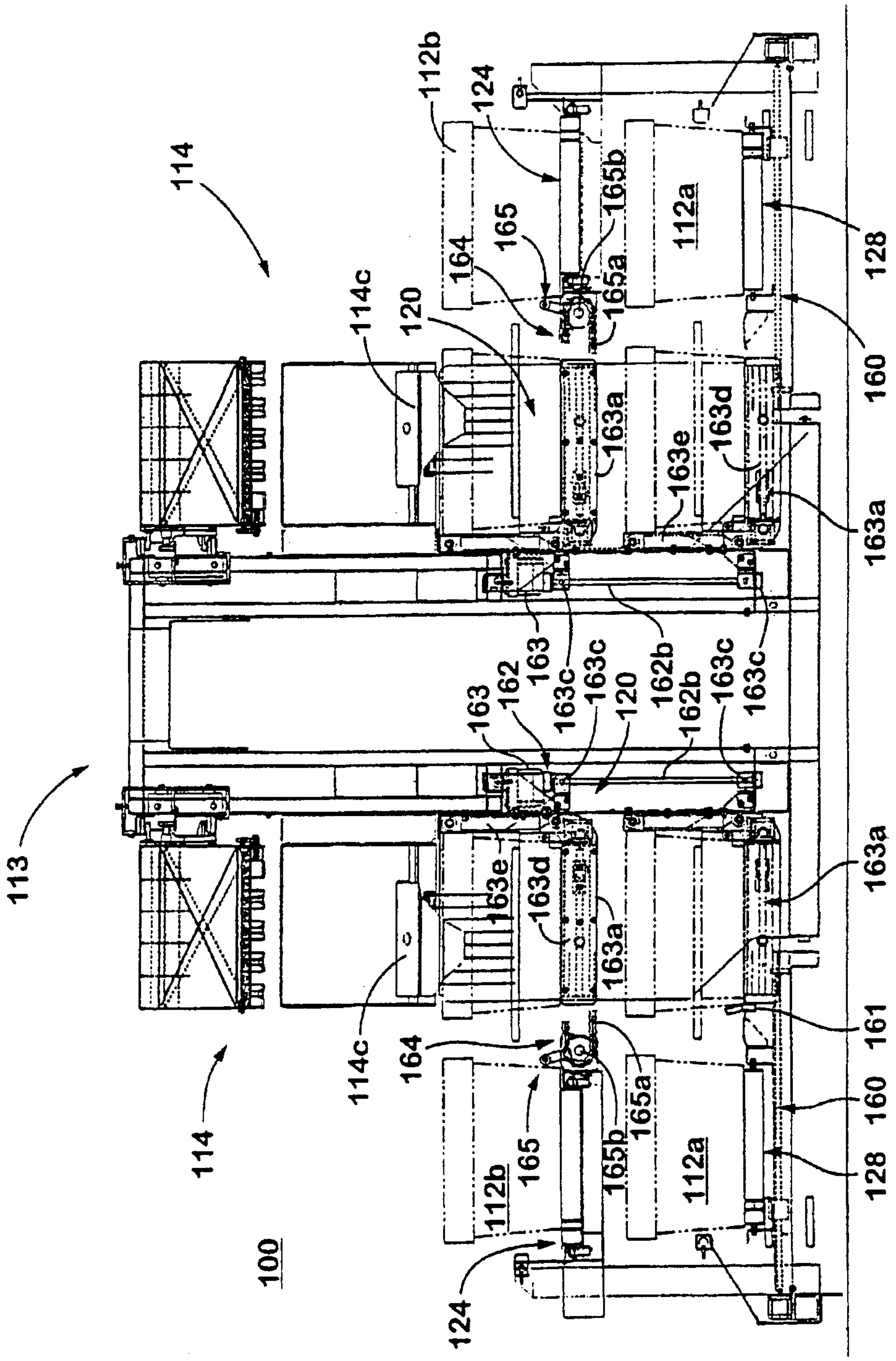
FIG. 12 is an end elevation of the tray handling system of FIG. 11, with the tray handling system extending along both sides of a pair of rows of mail sorters.
Figure 13:
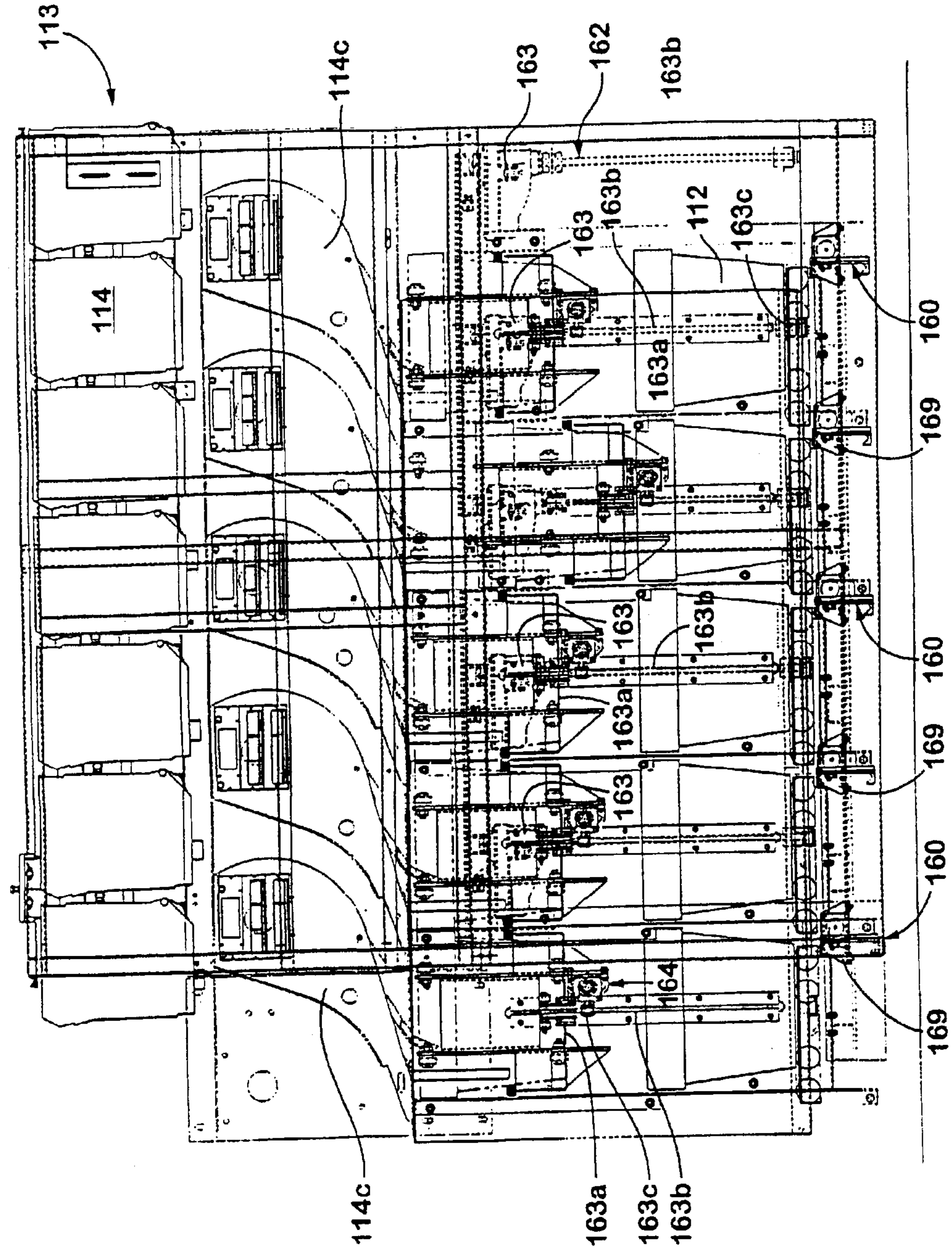
FIG. 13 is a side elevation of a portion of the tray handling system of FIGS. 11 and 12.

Tray moving devices 120 are positioned at each sorter unit 114 along the conveying surfaces 124 and 128. Each tray moving device 120 is operable to stop an empty tray moving along empty tray conveyor 128, pull the empty tray onto a tray support or tray lifter 163*a* and raise the empty tray upward to position the empty tray under the corresponding sorter unit for filling of the empty tray. After the tray is filled, the tray moving device is again operable to push or otherwise move the filled tray onto the upper full tray take away conveyor 124, whereby the full tray is conveyed along the conveyor to the labeler at the discharge end of the conveyor. As best shown in FIGS. 12 and 13, each tray-moving device 120 includes a lower tray-pulling device 160, a vertical tray moving device 162 and an upper tray-pushing device 164.

Each tray moving device 120 further includes a stop member 178, which is operable to raise between a pair of adjacent rollers along empty tray conveyor 128 to stop an empty tray, while lower tray pulling device 160 engages and pulls the empty tray onto the tray support 163*a*. Tray stop 178 may include a pivotable arm similar to stop member 78 discussed above, or may be any other means for stopping a tray along the conveyor, without affecting the scope of the present invention. It is further envisioned that the trays may be otherwise stopped at each targeted location along empty tray conveyor 128 via actuation and deactuation of individual powered roller zones which convey the tray along conveyor 128 and thus may be individually operable to stop the tray at a selected zone, without affecting the scope of the present invention.

Preferably, lower tray pulling device 160 includes an engaging arm 161, which is extendable to engage an opposite side of the empty tray from the tray moving device 120 and is retractable or otherwise movable toward the tray moving device 120, thereby engaging the opposite side of the empty tray and pulling the empty tray toward the moving device 120. Lower tray pulling device 160 may be movable via any know means, such as via a driven belt, similar to tray moving device 60 discussed above, or via a linear actuator 169 (FIG. 13), similar to linear actuator 69 discussed above and shown in FIG. 15. Lower tray moving or pulling device 160 may be mounted at the tray moving device 120, or may otherwise be movably mounted along and between a pair of adjacent rollers at the empty tray conveyor 128. As best shown in FIG. 14, each tray moving device 120 further includes a guide member 194, which functions to guide the empty tray into position on the supports 163*a*, such that the empty tray is properly oriented for receiving the sorted mail from the sorter unit 114.

Once an empty tray has been pulled from the empty tray conveyor 128 and onto tray support 163*a*, vertical tray raising device 162 is operable to raise the supports 163*a* and thus the empty tray upward into position immediately beneath the chute 114*c* of the associated sorter unit 114. Preferably, vertical tray raising device 162 includes a vertical ball/screw actuator 163, which is operable to rotate a threaded shaft 162*b* to raise tray support 163*a* via engagement with a threaded connector 163*c* at tray supports 163*a*. Tray supports 163*a* are preferably a pair of L-shaped metal support arms which support the trays at a lower arm 163*d* of support arm 163*a*, while an upper arm 163*e* is mounted to the vertical tray moving device 162. Vertical tray moving device 162 is thus operable to raise the tray upwardly and to support the empty tray as the empty tray is filled by the corresponding sorter unit 114. Accordingly, the tray supports 163*a* must have sufficient strength to support the weight of a filled tray.

After the tray has been filled by the sorter unit 114, upper tray moving or pushing device 164 is operable to push or otherwise move the filled tray from the support 163*a* onto the upper, full tray take away conveyor 124. Upper tray moving device 164 preferably includes an integral motor operated pusher 165 and is mounted at support 163*a*, as shown in FIG. 13. The pusher or tray engaging member 165 may be movable along a chain, belt or linkage 165*a* via a pair of driven and guide wheels 165*b*, similar to tray moving device 64, discussed above. Preferably, the engaging member 165 engages a lower portion of the trays, as shown in FIG. 12, to prevent tipping of the filled tray as it is moved onto upper conveyor 124. After the filled tray has been moved onto the upper conveying surface 124, tray moving device 164 is operable to reverse the direction of movement of the engaging member 165 to return the engaging member to an initial position at an inward side of the tray support 163*a*. Because upper tray moving device 164 is operable to move a filled tray onto the upper conveying surface 124, tray moving device 164 must be sufficiently durable and powerful to engage and move the filled trays from the supports 163*a* onto the conveying surface 124. Although shown as a chain driven engaging member, the moving device 164 may include any known means for moving the tray from the support surface 163*a* onto the conveying surface 124, without affecting the scope of the present invention.

Automatic tray handling system 100 includes an integrated software and control system which is designed to track filled trays from each of the sorter units to the labeling system at a discharge end of the tray handling system, in order to ensure that the correct label is applied to the appropriate tray. A scanner (not shown) is provided to scan the applied label and confirm that the correct label was applied to the appropriate tray. If the label is not correct, the tray is diverted to a reject area, where a signal may be provided to notify an operator that the tray was mislabeled.

During operation, automatic tray handling system 100 is operable to move empty trays along the empty tray conveyor 128 positioned at one or both sides of the sortation system 113. Preferably, empty mail trays are inducted onto the empty tray conveyors and staged at every third bin or sorter unit such that they are positioned to provide optimum clearance and gapping for proper tray transferring, and to avoid potential interference between trays. When an empty tray is called for at one of the bin or sorter units which does not have a tray positioned thereby, the tray stop members, which are operable to retain an empty tray at a upstream position along the empty tray conveyor 128, will release the empty tray and allow the tray to advance to the desired position. The tray stop member 178 of tray moving device 120 will stop the empty tray at the appropriate sorter unit and lower tray moving device 160 will move the empty tray onto the tray supports 163*a* for raising the tray to the sorter unit. After the empty tray is raised into position under chute 114*c*, the empty tray is then filled by the sorter unit until the control system indicates that the tray has been filled. Once the tray is filled, the upper tray moving device 164 is operable to move the filled tray onto the full tray take away conveyor, provided there is no full tray present in the transfer path. After the upper tray moving device 164 returns to its initial position, the vertical tray moving device 162 will lower the supports 163*a* and prepare to accept another empty tray from the empty tray conveyor 128 and lower tray moving device 160.

The control system of the automatic tray handling system are operable to prevent any interference between oncoming trays on the upper conveyor 124 and full trays ready to be discharged from the tray supports and sorter units. When a tray becomes filled by the particular sorter at which it is positioned, the flat sorter unit will communicate to the automatic tray handling system controller that the tray must be removed. When a tray is destined to exit the sorter unit, and an open position is available on the filled tray conveyor 124, the upstream trays will be held in position along the conveyor 124 until the tray leaving the particular sorter unit is moved onto the conveyor 124. Once the tray is in position on the conveyor, all of the trays may continue to move toward the label printer. If a tray is ready to leave the sorter and an open position is not available on the take away conveyor 124, such as because another tray is moving into position, the full tray will be held at the sorter unit until the position is cleared.

The control system identifies and acknowledges discharged full trays along the full tray conveyor 124, and is operable to track the full trays along the length of the full tray conveyor 124 to the automatic labeling system located at the discharge end of the conveyor. Preferably, each sorter unit is positioned at an individual zone or section of the powered roller conveyor 124 which consists of its own powered zone and sensor assembly, thereby facilitating individual zone-to-zone tracking of trays by the control. The tray tracking system of the present invention is operable to ensure that the filled tray has the proper label attached to it at the label printers. Accordingly, the trays must be tracked from their sort location to the labeler. Each filled tray is electronically identified with appropriate destination data by the sorter machine software before the tray leaves the respective sorter unit. After the sort schedule is determined, the software will communicate to the automatic tray handling system controller which output bin destinations are dedicated to each sort location on the sortation system. The data can then be tracked with the tray when it is discharged from the sorter unit.

Preferably, each tracking zone is associated with a particular sorter unit and is independently controlled. Each zone also may utilize a photo eye or sensor to identify the tray position along the conveyor. Whenever a full tray is discharged from a sorter unit onto the full conveyor 124, the output bin destination data is electronically moved with the tray, as the tray is conveyed toward the automatic label printer. The tray will be conveyed into the next zone or zones if those zones are not occupied by another tray. The tray continues to be conveyed along the full tray conveyor 124 as long as the next downstream zone is clear or vacant. When the filled tray reaches the label printer, the control of the automatic tray handling system 100 is operable to communicate to the label printer which label data must be printed for that particular tray. The correct label will then be printed and affixed to the tray. A scanner (not shown) may be provided to scan a bar code on the printed label once it has been printed and applied, in order to verify that the label is correct for that particular tray.

If the sensor or photo eye detects a tray positioned at a particular zone for a prolonged period of time, the system is operable to detect a jam in the conveyor. When a jam has been detected, the system is operable to hold all of the upstream trays until the jam has been cleared and the system reset. Preferably, the system is also operable to detect a missing tray if a tray is removed, to detect a tray that does not belong in that particular zone, or to detect an extra tray that has been placed on the filled tray conveyor 124. The extra tray will be sent to the reject area until the tray's data can be accounted for.

Automatic tray handling system 100 is also operable to perform a sweep process to clear the full trays from the system. During the sweep process, the empty trays staged at every third position along the empty tray conveyor 128 are advanced to close gaps, while any required additional trays may be fed into the conveyor at the induct stations. As part of the sweep process, any remaining mail in the mail supply and/or sortation system must be sorted to the appropriate bins before any full trays can be swept. Once the message is received that the sort is complete and all remaining mail has been discharged from the sorting system buckets, the full tray sweep process can begin.

Because of clearance issues along the full tray conveyor 124, full trays at every other sorter unit are initially discharged. The upper tray moving devices 164 are operable to substantially simultaneously push or extend the full trays 112*b* onto full tray conveyor 124. When the tray moving devices 164 retract, the vertical tray moving devices 162 are operable to lower the supports 163*a* to position the supports at a lower level to accept empty trays from the empty tray conveyor 128. The first half of the filled trays are then advanced toward the automatic labeler, while empty trays along the empty tray conveyor 128 are simultaneously transferred onto the respective supports 163*a*. While the empty trays are lifted into the first group of empty sorter units, and while the last tray of the preceding group passes the sorter unit at the downstream end of the conveyors, the second group of filled trays from the other sorter units are discharged onto the full tray conveyor 124. Similar to the first set, as soon as the tray moving devices 164 return, the empty tray replenishment process is repeated for the second group of sorter units. While the second group of trays are being pushed out, the empty trays are staged simultaneously, such that the empty trays are positioned to be pulled onto the supports 163*a* for the second group of sorter units.

Accordingly, the present invention provides an automatic tray handling system that is especially useful with automated article sorting machines, such as flats mail sorting machines. However, the invention could be used with other sorters such as letter mail sorters and the like, without affecting the scope of the present invention. The present invention is thus operable to deliver empty trays to any and all of the sorter units of the sortation system and further is operable to automatically convey full trays to the labeling stations. The tray handling system of the present invention is operable to deliver empty trays to individual sorter units and remove filled trays from the sorter units, whereby the filled trays are conveyed to downstream operations, such as a labeling station, at a discharge end of the tray handling system. The only manual intervention that may be required is to manually induct multiple empty trays into the system, whereby the tray handling system conveys and stages the trays for filling at the appropriate sorter units. The present invention is designed to be adapted for implementation with conventional or known sorting machines, such that the present invention may be retrofitted to existing units with minimal changes required to the sorting machine unit.

Additionally, the automatic tray handling system of the present invention provides a safe working environment for operators and maintenance personnel, while at the same time maintaining ready access to the sorter units of the sorting machine. The automatic tray handling system is also configured to minimize space taken up around the sorter machines.

The control system of the present invention further facilitates electronic tracking of trays along the conveyors between the sorter units and the labeling stations. After a label is applied to the tray, the label may be scanned to verify that the label was printed properly for that particular tray. The present invention is preferably tied into the controls of the sortation system, such that the sortation system can communicate to the tray handling system when a particular tray has been filled and when an empty tray is needed at each of the sorter units of the sortation system.

Changes and modifications in the specifically described embodiments can be carried out without departing from the principles of the invention, which is intended to be limited only by the scope of the appended claims as interpreted according to the principles of patent law.

What is claimed is:

1. An automatic tray handling system for use with an article sorter having a plurality of sorter units and a plurality of tray support areas for positioning a tray while the tray is being filled with sorted articles, said automatic tray handling system comprising:

at least one conveyor operable to convey empty trays and at least partially filled trays generally adjacent to the tray support areas; and a plurality of tray moving devices positioned adjacent to the tray support areas, said tray moving devices being positioned partially below said at least one conveyor and operable to engage a portion of the empty trays and to push or pull the empty trays generally transverse to said at least one conveyor to move the empty trays from said at least one conveyor to the tray support areas, said tray moving devices being operable to engage an opposite portion of at least partially filled trays at the tray support areas and to push or pull the at least partially filled trays to move the at least partially filled trays from the tray support areas onto said at least one conveyor.

2. The automatic tray handling system of claim 1 including a plurality of tray stopping devices positioned along said at least one conveyor, said tray stopping devices being movable to stop an empty tray being conveyed along said at least one conveyor, said tray moving devices being operable to engage the portion of the stopped empty trays to move the stopped empty trays to the tray support areas.

3. The automatic tray handling system of claim 2, wherein said at least one conveyor comprises at least one roller conveyor having a plurality of rollers that are rotatable to convey trays therealong.

4. The automatic tray handling system of claim 3, wherein each of said tray stopping devices includes a stopping arm that is movable between a respective pair of rollers to protrude upwardly from the conveying surface to engage a forward portion of an empty tray to stop the empty tray.

5. The automatic tray handling system of claim 4, wherein said stopping arm is pivotable to move between the respective pair of rollers.

6. The automatic tray handling system of claim 1, wherein each of said tray moving devices comprises a generally U-shaped member with first and second push members at opposite ends of said generally U-shaped member, said U-shaped member being movable to push an empty tray onto the respective tray support area with said first push member and to push a partially filled tray off from the respective tray support area with said second push member.

7. The automatic tray handling system of claim 6, wherein said first push member is configured to engage a side portion of an empty tray on said at least one conveying surface and push the empty tray onto the tray support area associated with said tray moving device.

8. The automatic tray handling system of claim 7, wherein said second push member is configured to engage an opposite side portion of a partially filled tray on the tray support area and push the partially filled tray onto said at least one conveying surface.

9. The automatic tray handling system of claim 6, wherein said at least one conveyor comprises at least one roller conveyor, at least a portion of said U-shaped member being positioned below the conveying surface of said at least one roller conveyor and being movable between at least one pair of adjacent rollers to move empty trays to the tray support areas and to move partially filled trays from the tray support areas.

10. The automatic tray handling system of claim 1, wherein said tray moving devices are operable to slide empty trays from said at least one conveyor onto the tray support areas and to slide partially filled trays from the tray support areas onto said at least one conveyor.

11. The automatic tray handling system of claim 1, wherein said automatic tray handling system is adapted for use with a flats mail sorter.

12. An automatic tray handling system for use with an article sorter having a plurality of sorter units and a plurality of tray support areas for positioning a tray while the tray is being filled with sorted articles, said automatic tray handling system comprising:

at least one conveying surface which is operable to convey at least one of empty trays and at least partially filled trays generally adjacent to the tray support areas;

a plurality of tray stopping devices positioned along and at least partially below said at least one conveying surface, said tray stopping devices being movable to engage and stop an empty tray being conveyed along said at least one conveying surface; and a plurality of tray moving devices, said tray moving devices being operable to move the stopped empty trays generally transverse to said at least one conveying surface to move the stopped empty trays from said at least one conveying surface to the tray support areas, said tray moving devices being operable to move at least partially filled trays from the tray support areas to said at least one conveying surface.

13. The automatic tray handling system of claim 12, wherein each of said plurality of stopping devices comprises a stopping arm movably mounted at least partially below said at least one conveying surface and movable to project at least a portion of said stopping arm above said at least one conveying surface to engage and stop an empty tray.

14. The automatic tray handling system of claim 13, wherein said at least one conveying surface comprises at least one roller conveyor, said stopping arm being movable to project said at least a portion of said stopping arm between a pair of adjacent rollers and above the conveying surface of said at least one roller conveyor.

15. The automatic tray handling system of claim 14, wherein said stopping arms are pivotably mounted at least partially below said at least one conveying surface and pivotable to project at least a portion of said stopping arm above said at least one conveying surface.

16. The automatic tray handling system of claim 12, wherein each of said tray moving devices comprises a pulling arm that is movable generally transverse to said at least one roller conveyor and is movable between at least one pair of adjacent rollers to move the stopped empty trays to the tray support areas.

17. The automatic tray handling system of claim 12, wherein each of said tray moving devices comprises a generally U-shaped member with first and second push members at opposite ends of said generally U-shaped member, said U-shaped member being movable to push a stopped empty tray onto the respective tray support area and push a partially filled tray off from the respective tray support area.

18. The automatic tray handling system of claim 17, wherein said first push member is configured to engage a side portion of an empty tray on said at least one conveying surface and push the empty tray onto the tray support area associated with said tray moving device.

19. The automatic tray handling system of claim 18, wherein said second push member is configured to engage an opposite side portion of a partially filled tray on the tray support area and push the partially filled tray onto said at least one conveying surface.

20. The automatic tray handling system of claim 17, wherein said U-shaped member is positioned at least partially below said at least one conveying surface and is operable to slide an empty tray from said conveying surface onto the tray support area and to slide a partially filled tray from the tray support area onto said conveying surface.

* * * * *